United States Patent [19]
Yamagishi et al.

[11] Patent Number: 5,729,312
[45] Date of Patent: Mar. 17, 1998

[54] LCD AND METHOD FOR PRODUCING THE SAME IN WHICH A LARGER NUMBER OF SUBSTRATE GAP CONTROL MATERIALS IS LARGER IN THE POLYMER WALLS THAN IN THE LIQUID CRYSTAL REGIONS

[75] Inventors: Shinji Yamagishi, Osaka; Tokihiko Shinomiya, Nara; Kohichi Fujimori, Nabari; Kenji Nishiguchi, Osaka, all of Japan

[73] Assignee: Sharp Kabushiki Kaisha, Osaka, Japan

[21] Appl. No.: 404,539

[22] Filed: Mar. 15, 1995

[30] Foreign Application Priority Data

| Mar. 18, 1994 | [JP] | Japan | 6-049335 |
| Sep. 26, 1994 | [JP] | Japan | 6-229946 |
| Mar. 8, 1995 | [JP] | Japan | 7-048872 |

[51] Int. Cl.$^6$ .................... G02F 1/1333; G02F 1/1339
[52] U.S. Cl. ............... 349/86; 349/93; 349/155; 349/157
[58] Field of Search ............... 359/51, 52, 81; 349/86, 92, 93, 155, 156, 157

[56] References Cited

U.S. PATENT DOCUMENTS

| 4,966,442 | 10/1990 | Ono et al. | 349/155 |
| 5,162,934 | 11/1992 | Gunjima et al. | 359/80 |
| 5,426,522 | 6/1995 | Takahara et al. | 349/92 |
| 5,450,220 | 9/1995 | Onishi et al. | 359/51 |
| 5,473,450 | 12/1995 | Yamada et al. | 359/51 |
| 5,525,273 | 6/1996 | Konuma et al. | 359/51 |
| 5,583,575 | 12/1996 | Yamada et al. | 349/86 |
| 5,643,471 | 7/1997 | Onishi et al. | 349/84 |

FOREIGN PATENT DOCUMENTS

| 42 17 416 | 2/1994 | Germany | 359/51 |
| 56-99384 | 8/1981 | Japan . | |
| 58-501631 | 9/1983 | Japan . | |
| 60-131521 | 7/1985 | Japan . | |
| 64-61729 | 3/1989 | Japan . | |
| 2-139518 | 5/1990 | Japan . | |
| WO 83/01016 | 3/1983 | WIPO . | |

OTHER PUBLICATIONS

Shinomiya et al., "A STN–LCD with Excellent Pressure Resistance", Sharp Technical Journal, vol. 64, pp. 15–18, Apr. 1996.

*Primary Examiner*—William L. Sikes
*Assistant Examiner*—Walter Malinowski
*Attorney, Agent, or Firm*—Nixon & Vanderhye P.C.

[57] ABSTRACT

The liquid crystal display device of the invention includes; a pair of substrates disposed so as to be opposed to each other; and a display medium interposed between the pair of substrates, the display medium having liquid crystal regions comprising one or a plurality of pixels, and the liquid crystal regions being surrounded by polymer walls, wherein a number of substrate gap control materials which are disposed in a gap between the pair of substrates is larger in the polymer walls rather than in the liquid crystal regions.

21 Claims, 9 Drawing Sheets

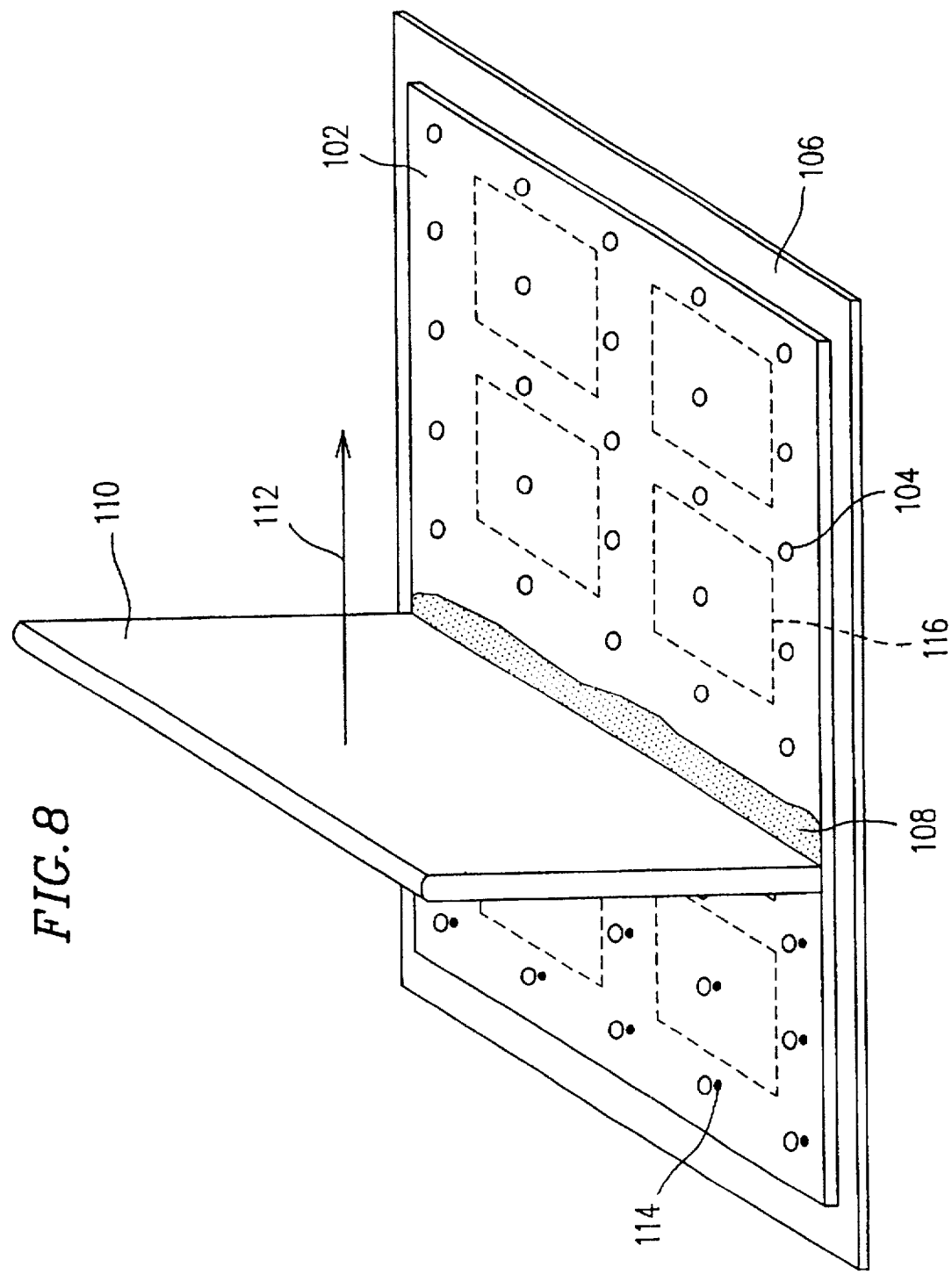

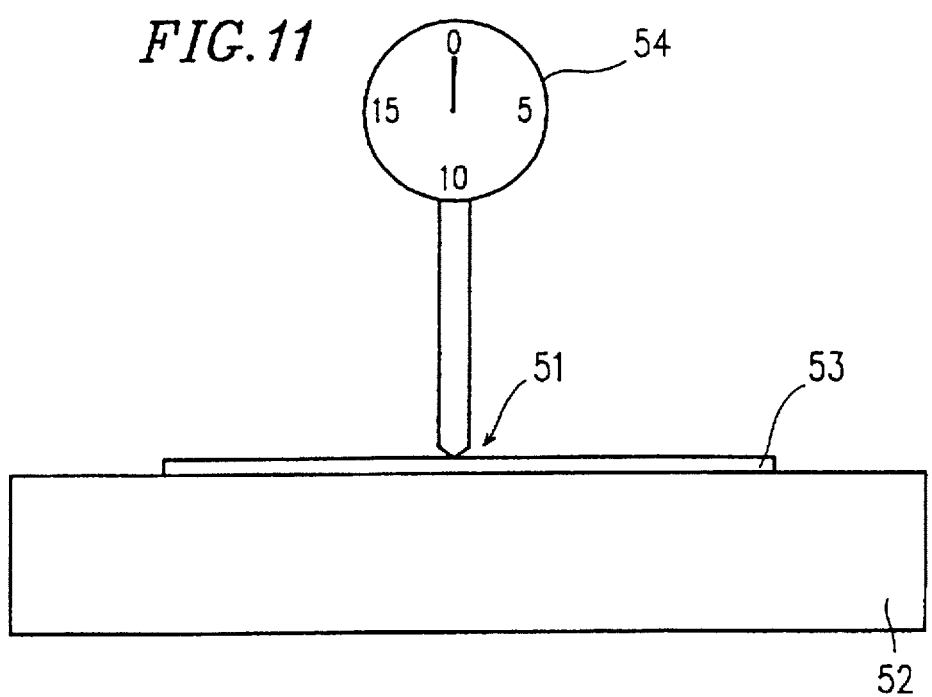

LCD AND METHOD FOR PRODUCING THE SAME IN WHICH A LARGER NUMBER OF SUBSTRATE GAP CONTROL MATERIALS IS LARGER IN THE POLYMER WALLS THAN IN THE LIQUID CRYSTAL REGIONS

BACKGROUND OF THE INVENTION

1. Field of the Invention

The present invention relates generally to a liquid crystal display device and a method for producing the same, and more particularly to a liquid crystal display device having a display medium layer including a polymer region and a liquid crystal region; and to a method for producing the same.

2. Description of the Related Art

Various kinds of display modes have conventionally been employed for conducting a display by the use of a liquid crystal display device (LCD). For example, as an LCD utilizing electrooptic effects, an LCD in a twisted nematic (TN) mode using the nemetic liquid crystal and an LCD in a super twisted nematic (STN) mode are currently used practically. An LCD using a ferroelectric liquid crystal (FLC) and an LCD in an electrically controlled birefringence (ECB) mode have recently been put into practical use. In addition, an LCD utilizing the scattering phenomena of light has been developed so as to operate in a dynamic scattering (DS) mode or in a phase change (PC) mode without using polarizers.

In the production of a conventional LCD, a substrate gap control material, such as a spacer, for maintaining a cell gap (or a substrate gap) at a certain value is used. In order to maintain the cell gap at a certain value, it is necessary to apply such spacers so that 25 to 100 spacers are distributed in a square millimeter. In such a conventionally constructed LCD, unnecessary spacers and the like remain inside the pixels after the LCD has been produced. As a result, the display quality of the pixels is adversely affected and the contrast is reduced because of the presence of such materials.

For example, if an LCD with such spacers remaining inside the pixels is used in a Normally White mode, then the aperture ratio is decreased because the light passing through the spacers is always blocked. On the other hand, if the same LCD is used in a Normally Black mode, then light leakage occurs at the time of the black display because the light passing through the spacers is never completely blocked. Therefore, the presence of the spacers inside the pixels causes a reduction in the contrast in both display modes. Accordingly, it is necessary to remove all of the spacers inside the pixels, or to remove as many spacers as possible in order to obtain an LCD of high display quality and high contrast. The following methods are proposed for reducing the number of the substrate gap control materials inside the pixels.

(1) A method for attaching a pair of substrates to each other by mixing substrate gap control materials into a sealing agent and then pressing only the portions of the substrates on which the sealing agent is applied (cf. Japanese Laid-Open Patent Publication No. 64-61729).

(2) A method for attaching a pair of substrates to each other so that the central portion of the panel is not pressed strongly by mixing substrate gap control materials into the sealing agent and then pressing the substrates by using a jig having an elastic body (cf. Japanese Laid-Open Patent Publication No. 2-139518).

(3) A method for patterning a wall of a photoresist film so that the wall is formed in the portion excluding the pixels (cf. Japanese Laid-Open Patent Publication No. 60-131521).

(4) A method for removing the remaining spacers out of the pixels by electrostatic induction after a liquid crystal is injected into the cell in which the substrate gap control materials are dispersed.

A mode for electrically controlling a transparent state and a white opaque state of the liquid crystal by the use of the birefringence thereof has recently been proposed. In an LCD operating in accordance with this mode, a display medium in which liquid crystal droplets are dispersed in a polymer is sandwiched between a pair of substrates being opposed to each other. This type of LCD is called a polymer dispersed liquid crystal (PDLC) display device. In a PDLC display device, in theory, a display is conducted in the following manner. When a voltage is applied to the liquid crystal, the orientations of the liquid crystal molecules are aligned towards the direction of the electric field. As a result, the ordinary refractive index of the liquid crystal molecules is matched with the refractive index of the polymer serving as a support medium, whereby a transparent state is obtained. On the other hand, when no voltage is applied to the liquid crystal, the random orientations of the liquid crystal molecules cause light scattering, whereby an opaque state is obtained.

According to a method for producing the above-described PDLC display device, the liquid crystal droplets are formed by using the phase-separation of the polymer and the liquid crystal as disclosed in Japanese Laid-Open Patent Publication No. 58-501631, for example. Thus the shapes of the liquid crystal droplets are not uniform, and it is difficult to precisely control the positions of the liquid crystal droplets in a direction along the surface of the substrates. Consequently, different driving voltages are required to be applied to the respective liquid crystal droplets, the threshold value exhibiting the electrooptic characteristics is less steep, and therefore the driving voltage becomes relatively high.

In order to solve the problems of the above-mentioned conventional PDLC display device, Japanese Patent Application No. 5-30998 assigned to the same assignee of the present application discloses a new display mode using an improved PDLC display device. In this LCD, ultraviolet rays are irradiated against the mixture of the liquid crystal and the photocurable resin so that some regions are irradiated with relatively intense light and other regions are irradiated with relatively weak light. As a result, the polymer is aggregated in the regions irradiated with the relatively intense light, while the liquid crystal is aggregated in the regions irradiated with the relatively weak light. According to this method, the phase separation of the polymer and the liquid crystal is conducted while selecting the appropriate positions, so that the liquid crystal regions may be formed in the pixel portions and the polymer regions may be formed in the portions excluding the pixel portions. In addition, if the polymer regions formed in the portions excluding the pixel portions are attached to the upper and the lower substrates, then the polymer regions may serve as spacers (or a substrate gap control material).

During the production process of this PDLC display device, the mixture containing the liquid crystal and the photocurable resin is injected into the gap between a pair of substrates, and then the mixture is irradiated with ultraviolet rays, whereby the liquid crystal droplets are formed in the pixel portions. Accordingly, when the mixture is injected, a substrate gap control material, such as a spacer, is required to be interposed between the pair of substrates. However, after the polymer wall is formed by curing the photocurable resin, the polymer wall itself serves as the substrate gap control material. As a result, a substrate gap control material, such as a spacer, is substantially unnecessary after the formation of the polymer wall.

In the case where the above-mentioned conventional method for reducing the number of the substrate gap control materials remaining inside the pixels is applied to such a PDLC display device, the following problems arise.

In accordance with the methods (1) and (2) for mixing the substrate gap control materials into the sealing agent, no spacers exist inside the pixels even at the time of injecting the mixture. As a result, the LCD is not resistant to minor volume changes of the mixture caused by ultraviolet ray irradiation.

The method (3) for patterning the walls of a photoresist film so as to form the walls outside the pixel portions cannot be applied to the PDLC display device because the photoresist film is photosensitive and requires a different production method.

In accordance with the method (4) for moving the spacers remaining inside the pixels by the use of electrostatic induction, the spacers are not removed but move to the peripheral portions of the liquid crystal droplets. Accordingly, the spacers remain in the peripheral portions of the pixels and the aperture ratio decreases, so that the display quality of the LCD is degraded.

As is apparent from the description above, according to the conventional methods, it is difficult to reduce the number of the spacers inside the pixels of a PDLC display device.

In a conventional LCD, either a common spacer or the polymer region serving as a spacer may be employed as a substrate gap control material for maintaining the substrate gap at a certain value, and the material may be spherical, stick-shaped, or cylindrical. However, such a substrate gap control material exhibits very poor resistance to a shock externally applied. Therefore, in the case where such a material is applied to a portable liquid crystal display panel or a liquid crystal display panel for inputting the data with a pen, the orientation state of the liquid crystal molecules is altered upon the application of the external pressure, so that the display becomes uneven and the display quality is disadvantageously degraded. In addition, if the panel is warped or bent, the panel is likely to be destroyed.

In order to eliminate such problems, several methods have been employed for improving the strength of a liquid crystal panel. In accordance with such methods, a protection plate such as a transparent glass plate or a plastic film is placed over the upper surface of the liquid crystal panel. According to the methods, however, a parallax is generated between the end of the pen and the display position. Furthermore, in the case where such methods are applied to a reflective LCD, the entire panel becomes undesirably dark.

On the other hand, a technique for improving the resistance to shock involving the use of an organic film such as a photoresist film is disclosed in Japanese Laid-Open Patent Publication No. 56-99384. More specifically, in accordance with this technique, before a pair of substrates are attached so as to be opposed to each other, a wall-shaped organic film such as a photoresist film is formed and served as a substrate gap control material. According to this technique, a photoresist film or the like to be used as a wall is formed before injecting the liquid crystal, thus the strength of the wall is expected to be rather strong in theory.

In spite of such an advantage, according to the method for improving the resistance to shock by forming a wall-shaped organic film such as a photoresist film, the formation of the photoresist film largely restricts the region into which the liquid crystal is injected, and requires very long time for filling with the liquid crystal. Moreover, in accordance with this method, a photoresist film is required to be patterned. The patterning of the film is likely to cause the erosion of an alignment film and the like, and adversely complicates the production process.

SUMMARY OF THE INVENTION

The liquid crystal display device of this invention includes: a pair of substrates disposed so as to be opposed to each other; and a display medium interposed between the pair of substrates, the display medium having liquid crystal regions comprising one or a plurality of pixels, and the liquid crystal regions being surrounded by polymer walls, wherein a number of substrate gap control materials which are disposed in a gap between the pair of substrates is larger in the polymer walls than in the liquid crystal regions.

According to another aspect of the invention, the method for producing a liquid crystal display device including a pair of substrates disposed so as to be opposed to each other; and a display medium interposed between the pair of substrates, the display medium having liquid crystal regions comprising one or a plurality of pixels, and the liquid crystal regions being surrounded by polymer walls is provided. The method includes the steps of: disposing the pair of substrates so as to be opposed to each other and interpose therebetween substrate gap control materials composed of a material tending to exist in the polymer walls rather than in the liquid crystal regions; injecting a mixture including at least a liquid crystal material and a photopolymerizable compound into a gap between the pair of substrates; and selectively irradiating the mixture with ultraviolet rays, thereby forming a display medium comprising the liquid crystal regions surrounded by the polymer walls and making a larger number of the substrate gap control materials exist in the polymer walls rather than in the liquid crystal regions.

In another aspect of the present invention, another method for producing a liquid crystal display device comprising: a pair of substrates disposed so as to be opposed to each other; and a display medium interposed between the pair of substrates, the display medium having liquid crystal regions comprising one or a plurality of pixels, and the liquid crystal regions being surrounded by polymer walls is provided. The method includes the steps of: disposing the pair of substrates so as to be opposed to each other by disposing substrate gap control materials at arbitrary positions on at least one of the pair of substrates; injecting a mixture comprising at least a liquid crystal material and a photopolymerizable compound into a gap between the pair of substrates; and selectively irradiating the mixture with ultraviolet rays, thereby forming a display medium comprising the liquid crystal regions surrounded by the polymer walls and making a larger number of the substrate gap control materials exist in the polymer walls rather than in the liquid crystal regions.

According to another aspect of the present invention, the liquid crystal display device includes: a pair of substrates disposed so as to be opposed to each other; and a display medium interposed between the pair of substrates, the display medium having liquid crystal regions surrounded by polymer walls at arbitrary positions, wherein the polymer walls are formed of a polymer material having a compressive value of 10 g/mmϕ or more in its cured state.

According to another aspect of the invention, the method for producing a liquid crystal display device, comprising a pair of substrates disposed so as to be opposed to each other; and a display medium interposed between the pair of substrates, the display medium having liquid crystal regions surrounded by polymer walls at arbitrary positions, is provided. The method includes the steps of: injecting a mixture including at least a liquid crystal material and a polymerizable compound having a compressive value of 10 g/mmφ or more in its cured state; and applying energy of heat or light to the mixture so as to phase separate the liquid crystal material and the polymerizable compound, thereby selectively forming the liquid crystal regions and the polymer wall at arbitrary positions.

In a liquid crystal display device according to the present invention, since the substrate gap control materials disposed in the gap between the pair of substrates are composed of a material which tends to exist inside the polymer walls rather than in the liquid crystal regions, a larger number of substrate gap control materials may exist inside the polymer walls as compared with the number of the materials existing in the liquid crystal regions. As a result, all or a number of substrate gap control materials are removed from the pixels, so that the display quality of the pixels and the contrast is improved.

In accordance with the method for producing a liquid crystal display device of the present invention, a pair of substrates are disposed so as to be opposed to each other and interpose the substrate gap control materials composed of a material which tends to exist inside the polymer walls rather than in the liquid crystal regions therebetween, and a mixture containing at least a liquid crystal material, a photopolymerizable material, and a photoinitiator is injected into the gap between the pair of substrates. If this mixture is selectively irradiated with ultraviolet rays, the photopolymerization rate in the portions irradiated with relatively intense ultraviolet rays is high, while that in the portions irradiated with relatively weak ultraviolet rays is low. Accordingly, the liquid crystal is separated into the portions irradiated with the relatively weak ultraviolet rays, thereby forming the liquid crystal droplets. In the case of using a substrate gap control material which is composed of a material such as a polymer resin which tends to exist inside the polymer walls rather than in the liquid crystal regions, or a spherical spacer, the surface tension of the liquid crystal expels the substrate gap control material out of the liquid crystal region during this phase separation step, so that the substrate gap control material is absorbed into the polymer wall composed of a photocurable resin.

Moreover, in the case where the mixture is irradiated with the ultraviolet rays so that different irradiation intensities are selected for the pixel portions and the portions excluding the pixel portions by masking the portions of the mixture corresponding to the pixel portions with a photomask, the liquid crystal region may be formed easily in the pixel portions under a simplified structure and the polymer walls are formed in the portions excluding the pixel portions. In this way, all or a number of substrate gap control materials are removed from the pixel portions. In addition, if at least one transparent electrode or the like made of an organic film, an inorganic film or a metal film is formed on at least one of the substrates facing the display medium, then the irradiated light may be selectively distributed more easily.

In the case of forming at least one alignment film composed of a material which tends to make a larger number of substrate gap control materials exist inside the polymer walls on at least one of the substrates facing the display medium, no substrate gap control materials remain in the alignment film. As a result, all or a larger number of spacers are removed from the pixels, so that the display quality of the pixels and the contrast may further be improved.

If the phase separation is conducted by using a mixture containing a photopolymerizable compound material and fine particles having respectively different refractive indices, then the fine particles are also absorbed into the polymer walls, thereby providing polymer walls in a light scattering state. As a result, reduction of the brightness of the panel may be suppressed. Conventionally, in the case where a liquid crystal display mode is selected so what two polarizers are disposed so as to be perpendicular to each other, the portions corresponding to the polymer walls are in an isotropic phase, so that the portions blacken. As a result, the entire panel also disadvantageously blackens and darkens. However, according to the invention, the polymer walls are in a light-scattering state, so that reduction of the brightness of the panel may be suppressed.

According to a method for producing a liquid crystal display device of the invention, a larger number of substrate gap control materials are disposed in the portions excluding the pixel portions on at least one of the substrates; a pair of substrates are disposed so as to be opposed to each other; and a mixture containing at least a liquid crystal material, a photopolymerizable material and a photoinitiator is injected into the gap between the pair of substrates. When the mixture is selectively irradiated with ultraviolet rays, if the portions corresponding to the pixel portions are masked with a photomask so as to selectively differentiate the irradiation intensities with respect to the pixel portions and the portions excluding the pixel portions, a phase separation is generated, and polymer walls are formed in the portions excluding the pixel portions in which a larger number of substrate gap control materials are included, while the liquid crystal regions are formed in the pixel portions having a smaller number of substrate gap control materials. As a result, a larger number of substrate gap control materials exist inside the polymer walls rather than in the liquid crystal regions. In addition, by utilizing an organic film, an inorganic film, or a metal film formed on at least one of the substrates facing the display medium, such as a transparent electrode, the irradiated light may be selectively distributed more easily.

If the phase separation is conducted by using a mixture containing a photopolymerizable compound material and fine particles having respectively different refractive indices, then the fine particles are also absorbed into the polymer walls, thereby providing the polymer walls in a light scattering state. As a result, reduction of the brightness of the panel may be suppressed for the same reason as that described above.

According to another aspect of the present invention, a mixture containing at least a liquid crystal material and a polymerizable compound is injected into the gap between a pair of substrates and the mixture is allowed to polymerize by the application of heat or light thereto, thereby phase-separating the liquid crystal material and the polymerizable compound. As a result, a display medium in which liquid crystal regions and polymer regions are selectively formed at arbitrary positions may be obtained. Since the polymer regions are composed mainly of a polymer material having a compressive value of 10 g/mmφ or more, the display quality in this region is not degraded, even if, for example, force or shock is externally applied to this liquid crystal display device by the data input with a pen or the like.

If an arbitrary vibration is applied to the substrates, or if a voltage is applied to the gap between the pair of substrates during this phase separation, the fine particles, such as the substrate gap control materials, may be effectively introduced into the polymer regions and therefore the shock resistance and the strength of the polymer regions may be improved. Furthermore, if all or a larger number of substrate gap control materials are removed from the pixel portions, then the display quality of the pixels and the contrast may also be improved.

In addition, since the polymer material constituting the polymer regions is composed of a thermosetting resin or a photocurable resin, the curable resin is formed so as to be cured and attached to both of the pair of substrates in the polymer region to which a high degree of energy such as heat and light is applied. As a result, the shock resistance may be further improved.

Thus, the invention described herein makes possible the advantages of (1) providing a liquid crystal display device which may improve the contrast and the display quality by removing all or a number of substrate gap control materials such as spacers inside the pixels of the polymer dispersed liquid crystal display device; and a method for producing the same, and (2) providing a liquid crystal display device which may be produced through a simplified production process for improving the shock resistance and eliminating the parallax between the end of a pen and the display position by selectively forming a polymer region and a liquid crystal region at arbitrary positions in the gap between a pair of substrates being opposed to each other; and a method for producing the same.

These and other advantages of the present invention will become apparent to those skilled in the art upon reading and understanding the following detailed description with reference to the accompanying figures.

BRIEF DESCRIPTION OF THE DRAWINGS

FIG. 8 is a perspective view showing a printing condition in the case of printing by using the pattern shown in FIG. 7B.

FIG. 11 is a schematic view of a tester for measuring a compressive value (hardness) of polymer walls.

DESCRIPTION OF THE PREFERRED EMBODIMENTS

Figure 1:
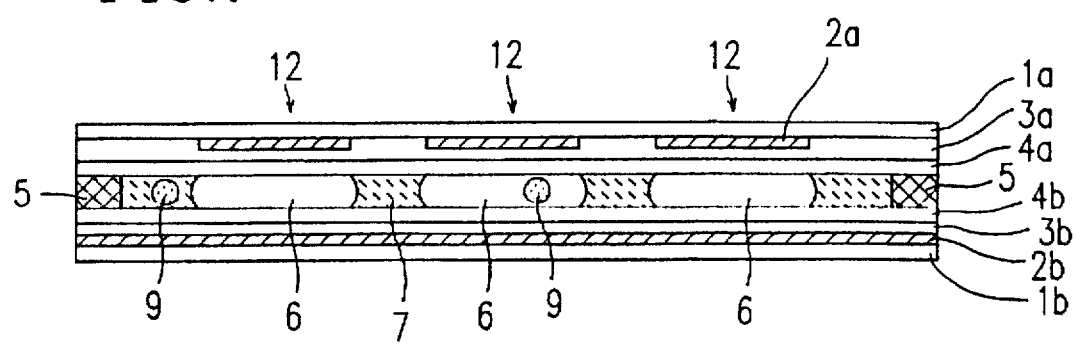
FIG. 1 is a cross-sectional view showing a construction of a liquid crystal display device according to an example of the present invention.

Hereinafter, the present invention will be described by way of illustrative examples with reference to the accompanying drawings. It is noted that the present invention is not limited to the following examples and specific examples.

A "substrate gap control material composed of a material which tends to exist inside the polymer walls rather than in the liquid crystal regions" herein will be defined as follows. (1) A sample (1 g) is obtained by mixing a liquid crystal material and a photopolymerizable monomer (a photocurable resin) so that the mole fractions thereof are 1:1. (2) A gap control material (0.05 g) is mixed with the sample. Then, the mixture is stirred and heated at 100° C. for an hour, thereby obtaining a mixture solution. (3) Next, after the mixture is cooled to room temperature, the mixture solution is dripped on a glass plate (about 2 cm$\phi$). Then, the mixture solution is selectively exposed to ultraviolet (UV) rays using a high-pressure mercury lamp for irradiating UV rays at an intensity of 10 mW/cm$^2$ for 20 minutes, thereby phase-separating the mixture into the polymer and the liquid crystal. (4) If the ratio of the number of the substrate gap control materials inside the polymer walls to the number of the substrate gap control materials in the liquid crystal regions satisfies the following expression, the substrate gap control material is defined as a substrate gap control material composed of a material which tends to exist inside the polymer walls rather than in the liquid crystal regions.

(the number of the substrate gap control materials inside the polymer walls)/(the number of the substrate gap control materials in the liquid crystal regions)>1.1

An "alignment film composed of a material which tends to make a larger number of substrate gap control materials exist inside the polymer walls" herein will be defined as follows. (1) A sample (2 g) is obtained by miming the liquid crystal and a material for the alignment film so that the mole fractions thereof are 1:1. (2) A substrate gap control material (0.1 g) is mixed with the sample. Then, the mixture is stirred and heated at 100° C. for an hour. (3) Next, after the mixture is cooled to room temperature, the mixture is allowed to stand for six hours, thereby separating the mixture into an upper layer (liquid crystal region) and a lower layer (alignment film region). (4) Then, a part of the solution in the upper and the lower layers is pumped with a pipette or the like, and the solution obtained from the respective layers is dripped onto a glass plate (about 1 cm$\phi$). If the ratio of the number of the substrate gap control materials in the alignment film portions to the number of the substrate gap control materials in the liquid crystal layer portions satisfies the following expression, then the alignment film is defined as an alignment film composed of a material which tends to make a larger number of substrate gap control materials exist inside the polymer walls.

(the number of the substrate gap control materials in the alignment film portions)/(the number of the substrate gap control materials in the liquid crystal layer portions)<1.0

Accordingly, in the case of using such an alignment film, a larger number of substrate gap control materials may exist inside the polymer walls rather than in the liquid crystal regions in a completed liquid crystal display device.

EXAMPLE 1

FIG. 1 is a cross-sectional view showing a construction of a liquid crystal display device (LCD) according to an example of the present invention. In the LCD shown in FIG. 1, a pair of substrates 1a and 1b made of glass or the like are disposed so as to be opposed to each other, and liquid crystal regions 6 surrounded by polymer walls 7 are sandwiched between the pair of substrates 1a and 1b so as to be employed as a display medium. On the surfaces of the substrates 1a and 1b facing the display medium, strip-shaped transparent electrodes 2a and 2b are formed. Over the electrodes 2a and 2b, electrically insulating films 3a and 3b are formed, and alignment films 4a and 4b are formed thereon. Pixel portions 12 including the liquid crystal regions 6 are defined by the opposed portions of the transparent electrodes 2a and 2b. The peripheral edges of the opposed substrates 1a and 1b are attached to each other by a sealing agent 5. In addition, spacers 9 are present in the gap between the pair of substrates 1a and 1b as the substrate gap control materials. As shown in the plan view of FIG. 2, the number of the spacers 9 present inside the polymer walls 7 is larger than that of the spacers 9 present in the pixel portions 12 including the liquid crystal regions 6.

This LCD may be produced, for example, in the following manner.

First, indium tin oxide (ITO) films are deposited on the substrates 1a and 1b by a sputtering technique so that the thickness thereof is 200 nm, thereby forming the strip-shaped transparent electrodes 2a and 2b. Next, the electrically insulating films 3a and 3b are formed by a sputtering technique so that the films 3a and 3b cover the transparent electrodes 2a and 2b. And then the alignment films 4a and 4b are formed thereon, and subjected to a rubbing treatment with a nylon cloth or the like. In this case, at least one of the substrates 1a and 1b is required to be made of a light-transmitting transparent material such as glass or plastic. Therefore, if one of the substrates is transparent, a metal film or the like may be formed on the other substrate the alignment films 4a and 4b are made of a material which tends to make a larger number of spacers 9 exist inside the polymer walls.

Under such a state, the spacers 9 are dispersed onto one of the surfaces of the alignment films 4a and 4b formed on the pair of substrates 1a and 1b. And then the substrates 1a and 1b are disposed so that the transparent electrodes 2a and 2b are perpendicularly opposed to each other. Finally, the peripheral edges of the substrates 1a and 1b are attached by the sealing agent 5, whereby a liquid crystal cell is produced. The material of this spacer 9 is preferably made of a material, such as polymer resin, which tends to remain in the polymer resin layer rather than in the liquid crystal layer. Accordingly, the spacer may be made of a material based on a divinyl, acryl, styrene, or melamine resin. So it is not preferable to use a spacer made of a material which is not likely to exist inside the polymer walls, such as a silica bead or an alumina bead. In addition, the spacer is preferably spherical. A fixing-type spacer adhering to the alignment films 4a and 4b formed on the substrates 1a and 1b should not be used.

The mixture containing at least a liquid crystal material and a photopolymerizable compound is injected into the gap (between the substrates 1a and 1b) of the liquid crystal cell produced in this way. Depending on relative necessity, a photoinitiator may be added to this mixture.

In this case, it is possible to use any liquid crystal material that is employable in a conventional LCD in a TN mode, an STN mode, an ECB mode, an FLC mode, or a light-scattering mode. For example, ZLI-4792 (manufactured by Merck & Co., Inc.) containing a chiral agent (S-811) by 0.3% may be used. As a photocurable resin, various materials such as R-684 (manufactured by Nippon Kayaku Co., LTD), p-phenylstyrene, isobornylmethacrylate, and perfluoromethacrylate may be employed. A photoinitiator such as Irgacure 651 (manufactured by Ciba Geigy) may be used. After the mixture is injected, the injection hole is sealed with an ultraviolet-curable resin. When the ultraviolet-curable resin is cured, care must be taken so that the display portion (or the injected mixture) is not irradiated with the ultraviolet (UV) rays.

Next, the mixture is irradiated with the UV rays emitted from a light source outside the liquid crystal cell. During this UV ray irradiation, some portions of the surface of a substrate to be irradiated with the rays are covered with a photomask including the light-shielding portions corresponding to the pixels portions, and the substrate is irradiated with the UV rays through the photomask. A high-pressure mercury lamp for irradiating collimated UV rays is employed as a light source. The light irradiation is conducted at a position where the intensity of the high-pressure mercury lamp is 10 mW/cm$^2$. The temperature of the substrates during this UV ray irradiation may be either ambient temperature or a temperature equal to or higher than $T_{NI}$ where the liquid crystal transitions from a nematic phase to an isotropic liquid phase. In the case where the UV ray irradiation is conducted at a temperature equal to or higher than $T_{NI}$, the orientation of the liquid crystal molecules may be stabilized.

In this example, the UV rays are selectively irradiated through the photomask in the above-mentioned manner, so that the pixel portions covered with the photomask are irradiated with relatively weak rays, while the portions excluding the pixel portions are irradiated with relatively intense rays. The polymerization rate of the photopolymerizable resin in the portions irradiated with the intense rays excluding the pixel portions is higher than that in the pixel portions irradiated with the weak rays. As a result, the liquid crystal is aggregated in the pixel portions, and the polymer is aggregated in the portions excluding the pixel portions, and therefore the phase separation of the liquid crystal and the polymer is realized. In consequence, the display medium in which the liquid crystal droplets (or the liquid crystal region) 6 are surrounded by the polymer walls 7 is formed in the gap between the pair of substrates 1a and 1b.

Accordingly, in the course of this phase separation step, the surface tension of the liquid crystal expels the spacers 9 which tend to exist inside the photopolymerizable resin out of the liquid crystal region and the spacers 9 are forced into the polymer resin. As a result, a larger number of spacers 9 exist inside the polymer walls 7 rather than that existing in the liquid crystal droplets 6. In other words, the quantity of the spacers 9 in the pixels may be reduced.

By utilizing organic films, inorganic films, or metal films or the like formed inside the cell, such as transparent electrodes made of ITO, in place of the photomask used at the UV ray irradiation step according to this example, the distribution (or the intensity) of the rays to be irradiated may be selected easily. In the case where the UV ray irradiation is conducted while heating the substrates to a high temperature so that the orientation of the liquid crystal may be stabilized, the substrates are slowly cooled down to room temperature inside a slow cooling oven. The cooling rate is preferably in the range of 3° C./h to 20° C./h, and more preferably in the range of 5° C./h to 10° C./h. After the polymer walls 7 are formed, the UV ray irradiation may be conducted again for a short period of time at a weak intensity so that the spacers 9 may be enclosed inside the polymer walls 7 by curing the non-reacted materials or that the polymers may be sufficiently crosslinked.

Hereinafter, it will be described how the spacers 9 are introduced inside the polymer walls 7 with reference to FIGS. 3A to 3E. In this case, spherical spacers which are composed of a polymer resin and which tend to remain inside the photocurable resin are employed. In the following description, the temperature of the substrate at the irradiation step is set at a temperature where the liquid crystal is in the isotropic liquid state.

Figure 3A:
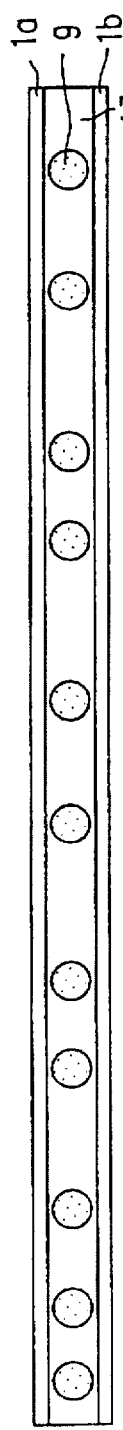
FIG. 3A through 3E are cross-sectional views illustrating how the spacers are introduced into the polymer walls during the production process of the liquid crystal display device of FIG. 1.

FIG. 3A shows a liquid crystal panel in which the mixture 13 is injected into the gap between the pair of substrates $1a$ and $1b$ thereof before the exposure step is conducted. The spacers 9 are scattered over the entire surface of the substrates as the substrate gap control materials. In this state, the spacers 9 are in contact with both the substrates.

Figure 3B:
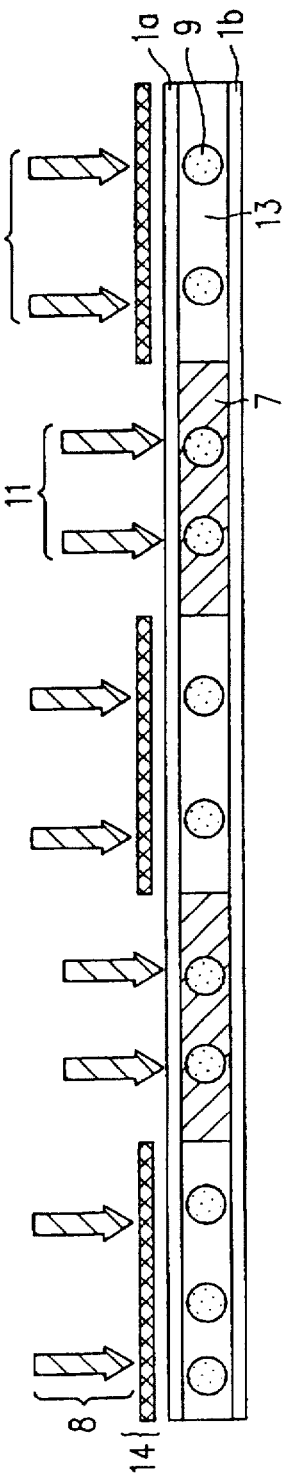

Next, FIG. 3B shows an UV ray irradiation step. A photomask 14 is formed over the surface of the substrate $1a$ on the light input side so as to cover the pixel portions, and then the UV rays 8 are irradiated thereto. The portions on which the photomask 14 is formed, i.e., the light-shielding portions 10, ore irradiated with relatively weak rays, while the portions on which no photomask 14 is formed, i.e., the light-transmitting portions 11, are irradiated with relatively intense rays. The polymerization rate in the portions irradiated with the intense rays is higher than that in the portions irradiated with the weak rays, so that the polymer walls 7 are formed as indicated by the oblique lines shown in FIG. 3B. The temperature of the substrates is set at a temperature where the liquid crystal is in an isotropic liquid state. If the panel is heated to about a temperature equal to or higher than $T_{NI}$, the volume of the mixture including the liquid crystal expands. As a result, some space is formed between the substrates and the spacers, which have been in contact with the substrate as mentioned above. The space allows the spacers go move. Under this condition, by conducting light irradiation and slow cooling, as will be described below, the spacers may be moved to desired positions. This principle of moving the spacers is applicable to other examples according to the invention.

Figure 3C:
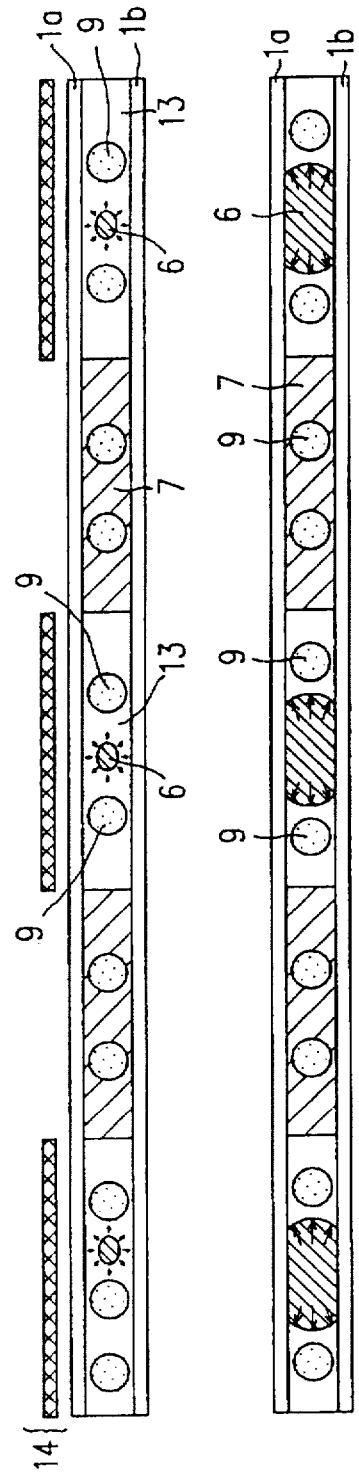

FIG. 3C shows a slow cooling step after the UV rays have been irradiated. At this stage, the phase separation of the liquid crystal and the polymer is in progress, and the liquid crystal regions 6 are gradually growing. At the same time, the spacers 9 which tend to exist inside the photocurable resin are moved out of the liquid crystal regions 6 by the surface tension of the liquid crystal.

Figure 3D:
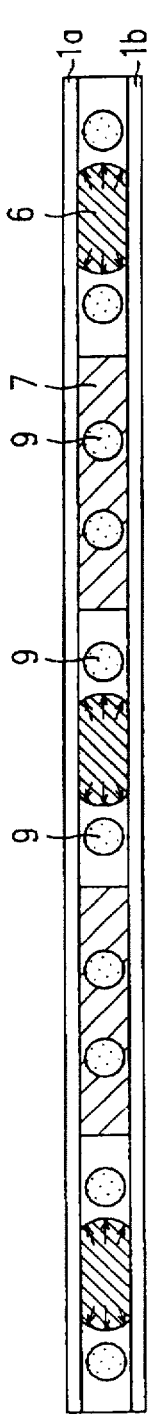

As the slow cooling proceeds, as shown in FIG. 3D, the liquid crystal regions 6 expand and, at the same time, the spacers 9 are further moved outward so as to be aggregated in the polymer walls 7. At this stage, the polymer walls 7 have not been cured completely and still have flexibility, so that the spacers 9 which tend to exist inside the photocurable resin are introduced into the polymer walls 7.

Figure 3E:
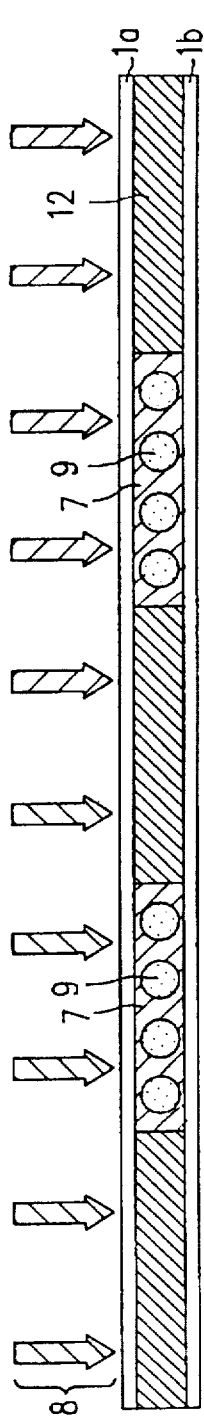

Finally, as shown in FIG. 3E, the UV ray irradiation step is conducted again in order that non-reacted materials are cured and that the polymers are sufficiently crosslinked. As shown in this figure, the UV ray irradiation is conducted against the entire surface of the substrate $1a$, so that the spacers 9 are enclosed inside the polymer walls 7 indicated by the slant lines.

In the LCD thus-obtained, the number of the spacers 9 present inside the polymer walls 7 is larger than that in the liquid crystal regions 6. As a result, all or a number of the spacers 9 may be removed from the pixels. Therefore, an LCD of high display quality and high contrast may be obtained.

This LCD obtained in the above-mentioned manner may be employed as an LCD in a TN mode, an STN mode, an FLC mode, or an ECB mode by changing the liquid crystal material to be injected into the cell and/or changing the alignment film. In addition, this LCD may be employed as an LCD utilizing a light-scattering mode; and as a transmission-type or a reflective-type LCD by providing the polarizers on both surfaces of the cell or the reflector.

Hereinafter, a first specific example with respect to the first example will be described in detail below.

SPECIFIC EXAMPLE 1-1

First, transparent electrodes $2a$ and $2b$ made of ITO having a thickness of 200 nm are formed over the pair of substrates $1a$ and $1b$ by a sputtering technique. Next, electrically insulating films $3a$ and $3b$ made of $SiO_2$ are formed so as to cover the transparent electrodes $2a$ and $2b$ also by a sputtering technique. The alignment films $4a$ and $4b$ are formed thereon, and then subjected to a rubbing treatment with a nylon cloth. The pair of substrates $1a$ and $1b$ under this state are opposed so that the transparent electrodes $2a$ and $2b$ are perpendicularly opposed to each other, and then spherical spacers 9 (Micropearl: manufactured by Sekisui Fine Chemical, Co. Ltd.) are scattered therebetween at about 50 spacers per square millimeter. Finally, the peripheral ends of these substrates are attached to each other with a sealing agent 5 (Structbond XN-21S; baking temperature: 140° to 150° C./2 h), thereby fabricating a liquid crystal cell.

Into the gap between the substrates $1a$ and $1b$ of this liquid crystal cell, a mixture including 4 g of ZLI-4792 (manufactured by Merck & Co., Inc.) containing a chiral agent (S-811) by 0.3% as a liquid crystal material; 0.1 g of R-684 (manufactured by Nippon Kayaku Co., LTD), 0.07 g of p-phenylstyrene, 0.8 g of isobornylmethacrylate, and 0.1 g of perfluoromethacrylate as a photocurable resin; and 0.03 g of Irgacure 651 (manufactured by Ciba Geigy) as a photoinitiator is injected at an ambient temperature of about 30° C.

Subsequently, a surface of one of the substrates is covered with a photomask 14 so that the pixel portions are light-shielding portions, and then the UV rays are irradiated through the photomask by using a high-pressure mercury lamp which emits collimated rays with the intensity of 10 mW/cm². After this irradiation is completed, the cell is slowly cooled inside the slow cooling oven. Further, the UV ray irradiation is conducted again for a short period of tame at a week intensity so that the non-reacted material is cured and that the polymers are be sufficiently crosslinked.

Finally, polarizers are attached to both outer surfaces of the liquid crystal cell, thereby fabricating a liquid crystal display device in a TN mode.

Figure 2:
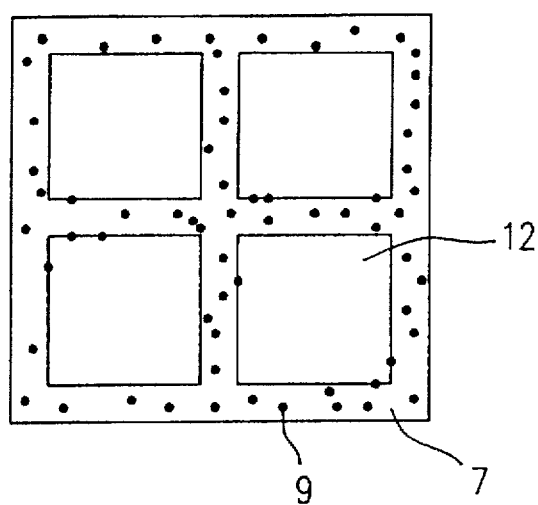
FIG. 2 is a plan view showing the liquid crystal display device of FIG. 1.

The LCD thus-obtained was observed with a microscope. As a result, it is revealed that the liquid crystal regions are concentrated in the pixel portions 12 and that no spacers 9 remain inside the pixel portions 12, as shown in FIG. 2. According to this Specific Example, the alignment films, composed of a material which tends to make the spacers 9 exist inside the polymer walls 7, are employed, so that neither polymers nor spacers remain in the interfaces between the liquid crystal regions and the alignment films and therefore the liquid crystal is in a satisfactory orientation state. The polymer walls 7 are formed substantially corresponding to the photomask pattern with the spacers 9 introduced therein, and no liquid crystal is introduced inside the polymer walls 7 and no polymer walls 7 intrude into the pixel portions 12. The contrast ratio of this LCD measures 30. The contrast ratio is obtained by transmitting the light through the LCD, and indicated at a ratio between the transmittance when no voltage is applied and that when a saturation voltage is applied.

COMPARATIVE EXAMPLE 1-1

In this example, an LCD in the TN mode is fabricated in the same manner as in Example 1 and specific Example 1, except that adhesive spacers are employed as the spacers.

Figure 4:
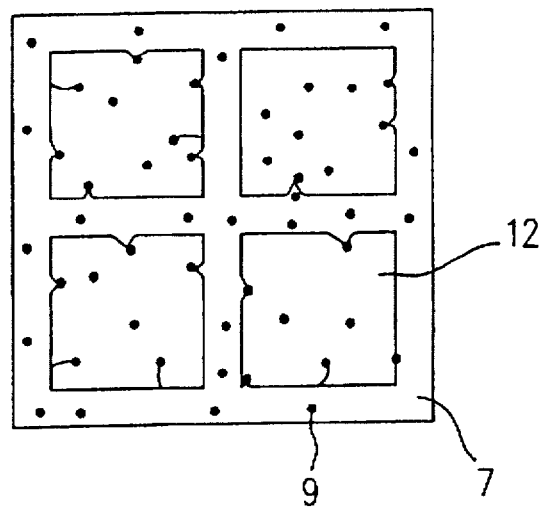
FIG. 4 is a plan view showing a liquid crystal display device according to a first comparative example.

The LCD thus-obtained is observed with a microscope. As a result, it is revealed that the liquid crystal regions are concentrated in the pixel portions 12 and that some spacers 9 remain inside the pixel portions 12, as shown An FIG. 4. In addition, polymer resin adhering to the spacers remains in the interfaces between the liquid crystal regions and the alignment films, and therefore the liquid crystal is not in a satisfactory orientation state. Several polymer walls 7 are formed at the positions according to with the photomask pattern being affected by the spacers 9 remaining around the walls. The contrast ratio of this LCD measures 23.

COMPARATIVE EXAMPLE 1-2

In this example, an LCD in the TN mode is fabricated in the same manner as in Example 1 and specific Example 1-1, except that silica beads (real spheres: manufactured by Catalysis Chemicals) are employed as the spacers.

Figure 5:
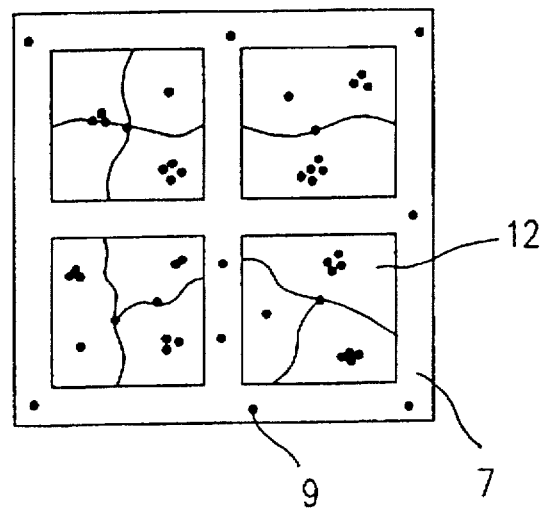
FIG. 5 is a plan view showing a liquid crystal display device according to a second comparative example.

The LCD thus-obtained is observed with a microscope. As a result, it is revealed that the liquid crystal regions are concentrated in the pixel portions 12 and that some spacers 9 remain inside the pixel portions 12 and that several lumps of spacers 9 are formed inside the pixel portions 12, as shown in FIG. 5. In addition, inside the pixel portions 12, the polymer resin adheres to the spacers 9 and leaves elongated trails here and there. Accordingly, the liquid crystal is not in a satisfactory orientation state. The contrast ratio of this LCD measures 20.

In the case where the LCD in the TN mode is fabricated using alumina (Alphaite: manufactured by Showa Electric Industrial) as the spacers, a similar result is obtained to that in the case of using the silica beads.

In the above-mentioned Example and specific Example, an LCD conducting a display by a simple-matrix driving has been described. However, the present invention may also be applied to other LCDs conducting several kinds of displays by an active-matrix driving and the like using thin film transistors (TFTS) or metal insulator metals (MIMs). Accordingly, a driving method is not limited to that described in these examples. The LCD of these examples may conduct a color display if a color filter and a black mask are provided for the LCD. Furthermore, the method of the invention may also be applied to an LCD in which the liquid crystal usable for the STN mode, the FLC mode, the ECB mode, the light-scattering mode, etc. other than the TN mode is surrounded by the polymer walls, and the invention may also be applied to either a transmission-type LCD or a reflective LCD.

EXAMPLE 2

An LCD in the STN mode according to a second example of the invention is constructed in the same manner as in the LCD shown in FIG. 1.

In the LCD shown in FIG. 1, a pair of substrates 1a and 1b made of glass or the like are disposed so as to be opposed to each other, and liquid crystal regions 6 surrounded by polymer wells 7 are sandwiched between the pair of substrates 1a and 1b so as to be employed as a display medium. On the surfaces of the substrates 1a and 1b facing the display medium, strip-shaped transparent electrodes 2a and 2b are formed. Over the electrodes 2a and 2b, electrically insulating films 3a and 3b are formed. Pixel portions 12 including the liquid crystal regions 6 are defined by the opposed portions of the transparent electrodes 2a and 2b.

The peripheral edges of the opposed substrates 1a and 1b are attached to each other by a sealing agent 5. In addition, spacers 9 are present in the gap between the pair of substrates 1a and 1b as the substrate gap control materials. As shown in the plan view of FIG. 2, the number of the spacers 9 present inside the polymer walls 7 is larger than that of the spacers 9 present in the pixel portions 12 including the liquid crystal regions 6.

This LCD in the STN mode may be produced, for example, in the following manner.

First, indium tin oxide (ITO) films are deposited on the substrates 1a and 1b by a sputtering technique so that the thickness thereof is 200 nm, thereby forming the electrically insulating films 3a and 3b made of $SiO_2$ by a sputtering technique so that the films 3a and 3b cover the strip-shaped transparent electrodes 2a and 2b.

And then the alignment films 4a and 4b are formed thereon by spin-coating polyimide (Sunever 150, Nissan Chemical Industries Ltd.) thereto, and subjected to a rubbing treatment with a nylon cloth or the like in a direction. The number of the transparent electrodes 2a and 2b is set to be four per one millimeter in a width direction. The gap between the adjacent electrodes is set to be 25 µm.

Next, the pair of substrates 1a and 1b subjected to the rubbing treatment are opposed to each other so that the alignment directions are crossed at an angle of 60 degrees. Spherical spacers (Haya Beads L11: manufactured by Hayakawa Rubber) are scattered on one of the substrates 1a and 1b subjected to the rubbing treatment at about 50 spacers per square millimeter.

Subsequently, the peripheral edges of the substrates 1a and 1b are attached by the sealing agent 5 (Structbond XN-21S; baking temperature: 140° C. to 150° C./2 h), whereby a liquid crystal cell is produced.

Then, a mixture material used as a display medium is injected into the gap between the substrates 1a and 1b of this liquid crystal cell at an ambient temperature of 30° C. The mixture material for the display medium is obtained by mixing: 4 g of a liquid crystal material ZLI-4427 (including S-811 manufactured by Merck & Co., Inc.); 0.1 g of R-684 (manufactured by Nippon Kayaku Co., LTD), 0.07 g of p-phenylstyrene. 0.8 g of isobornylmethacrylate, and 0.1 g of perfluoromethacrylate as photocurable resin materials; and 0.03 g of Irgacure 651 (manufactured by Ciba Geigy) as a photoinitiator. Other kinds of curable resins may be used for forming the polymer walls 7. The injection holes are sealed with a commonly used UV curable resin. At this step, the display portion of the substrates (or the injected mixture) should not be irradiated with the rays.

Next, a photomask is placed on one of the substrates of the liquid crystal cell produced in the above-described manner so that the pixel portions block the UV rays. Then, the mixture material is irradiated with the UV rays from the photomask side. For example, a high-pressure mercury lamp for irradiating collimated UV rays is employed as a light source. The light irradiation is conducted at a position where the intensity of the high-pressure mercury lamp is 10 mW/cm$^2$. The temperature of the substrates during this UV ray irradiation may be a temperature equal to or higher than $T_{NI}$ where the liquid crystal transitions from a nematic phase to an isotropic liquid phase. As a means for selectively irradiating the light, an organic film, an inorganic film or a metal film formed in the cell may be used in place of the photomask so as to selectively distribute the irradiated light.

In the case where the UV ray irradiation is conducted while heating the substrates at a high temperature ($T_{NI}$ or higher) in order to stabilize the orientation of the liquid crystal, the substrates are slowly cooled down to room temperature inside a slow cooling oven after the irradiation step. The cooling rate is preferably in the range of 3° C./h to 20° C./h, and more preferably in the range of 5° C./h to 10° C./h. After the polymer walls 7 are formed, the UV ray irradiation may be conducted again for a short period of time at a week intensity so that the spacers 9 may be enclosed inside the polymer walls 7 by curing the non-reacted materials or that the polymers may be sufficiently crosslinked. In this way, the liquid crystal portion and the polymer wall portions are formed. The liquid crystal portion shows an STN orientation having a twist angle of 240 degrees.

Figure 6:
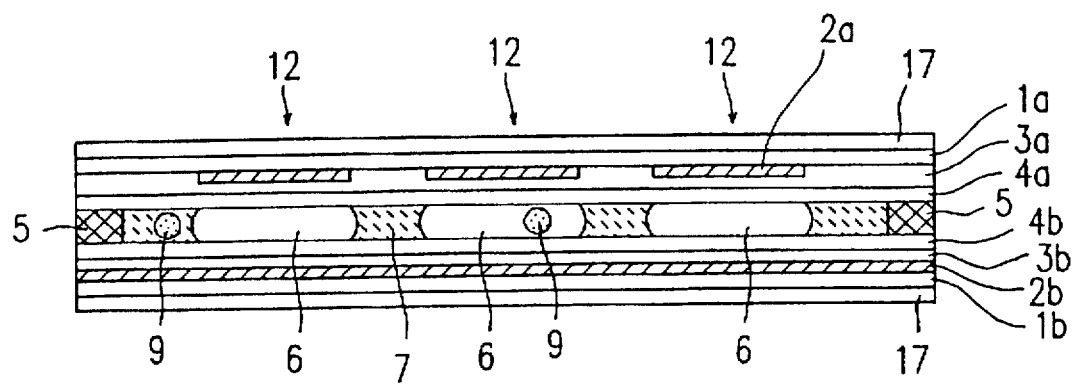
FIG. 6 is a cross-sectional view showing a liquid crystal display panel on which polarizers are attached according to a second example of the present invention.
Figure 7A:
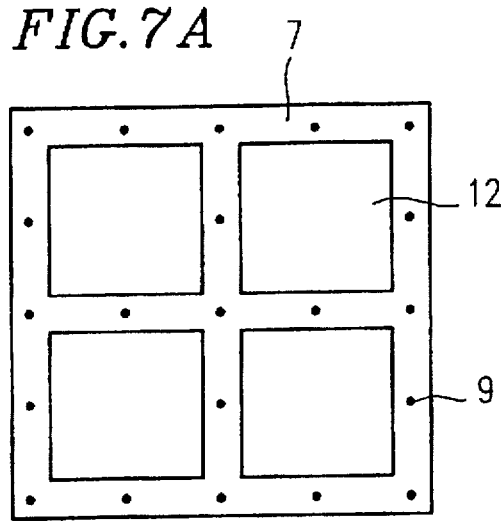
FIGS. 7A to 7D are plan views showing various patterns in the case of printing by using a screen plate according to a third example of the present invention.
Figure 7B:
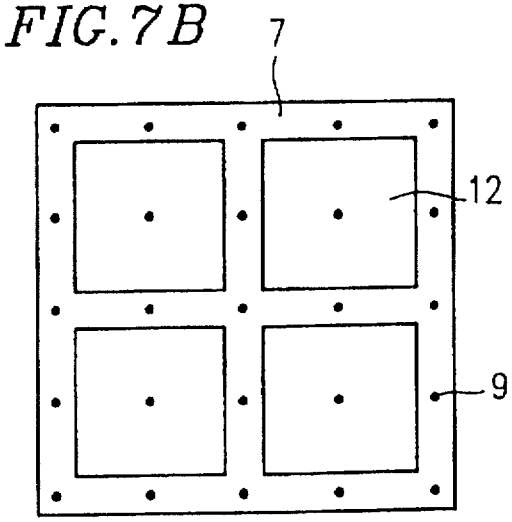
Figure 7C:
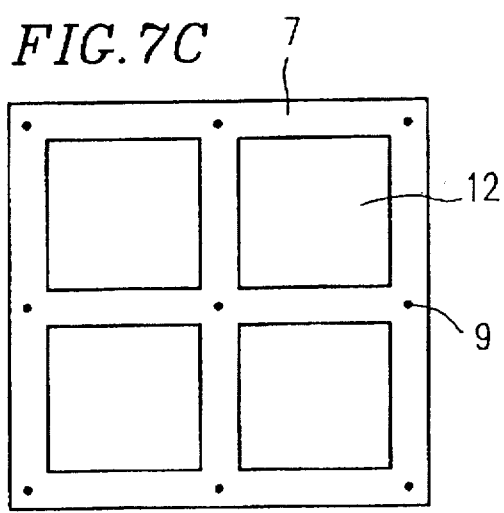
Figure 7D:
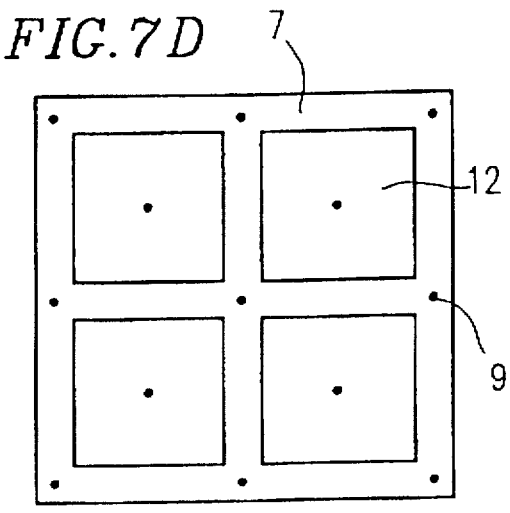
Figure 9:
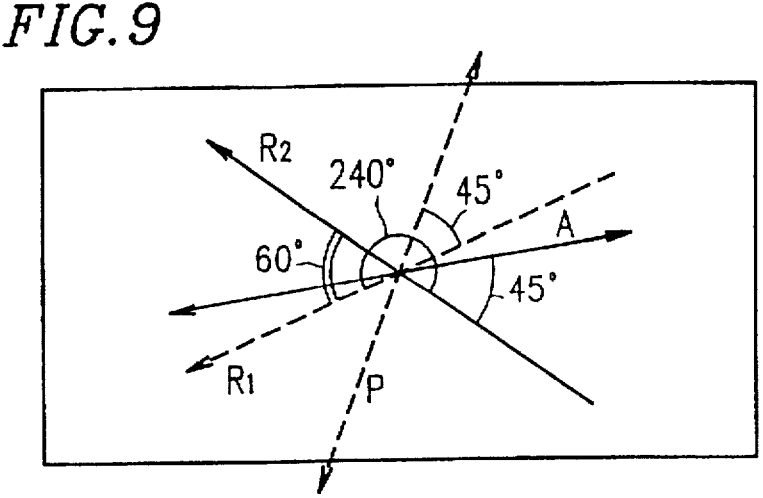
FIG. 9 is a plan view showing the polarization axes and the rubbing directions of the panel in Examples 2 and 3.

As shown in FIG. 6, the polarizers 17 are attached to the panel of FIG. 1 which has been produced in the above-described manner. As shown in FIG. 9, the angle formed between the respective two polarization directions P and A of the polarizers 17 is set to be 60 degrees, and the angles formed between the two polarization directions P and A and the corresponding two rubbing direction R1 and R2 are set to be 45 degrees respectively, thereby producing an STN-mode LCD of a yellow mode transmission type.

In this Example 2, the present invention is applied to a transmission type LCD in the STN mode without using phase plates. However, the present invention is not limited thereto, but instead may be applied to a reflective LCD in the STN mode by providing reflectors therefor. In the case where the phase plates are provided for the LCD, monochrome display colors and the like may also be used. If the phase plates patterned so as to correspond to the respective pixels are provided for the LCD in the STN mode, a liquid crystal display mode with high contrast is realized. A material for the substrates is not particularly limited in this example, but a light-transmitting transparent body such as a glass plate and a plastic film may be used. In addition, one of the pair of substrates may contain metal.

Moreover, if the substrate gap control materials obtained by mixing photopolymerizable compound materials and fine particles having different refractive indices are used, then the fine particles may also be absorbed into the polymer walls and the polymer walls may scatter the light.

The portions corresponding to four pixels (shown in FIG. 2) of the liquid crystal cell are observed with an optical microscope and a scanning electron microscope (SEM). As a result, it is revealed that almost no spacers 9 or polymers remain in the interfaces between the liquid crystal regions 6 and the alignment films 4a and 4b, and that the liquid crystal is in a satisfactory orientation state. The polymer walls 7 are formed substantially corresponding to the photomask pattern with the spacers 9 introduced therein, and no liquid crystal is introduced inside the polymer walls 7 and no polymer walls 7 intrude into the pixel portions 12. The contrast ratio, one of the electrooptic characteristics of this LCD thus produced, measures 15. The contrast ratio is measured by transmitting the light through the LCD, and indicated by a ratio between the transmittance when no voltage is applied and that when a saturation voltage is applied.

The ratio applied to the substrate gap control material which tends to exist inside the polymer walls rather than in the liquid crystal regions as defined above is calculated with respect to the LCD of this example. The result is expressed by the following equation.

(the number of the substrate gap control materials existing inside the polymer walls)/(the number of the substrate gap control materials existing in the liquid crystal portions)=1.32

COMPARATIVE EXAMPLE 2-1

In this comparative example, five kinds of LCDs having the above-mentioned construction are produced by using the substrate gap control materials shown in the following Table 1 in place of the spherical spacers used in Example 2. The contrast ratios for the respective LCDs are also shown in Table 1.

TABLE 1

| manufacturer | name of the substrate gap control material | contrast ratio |
| --- | --- | --- |
| (1) Hayakawa Rubber | Haya Beads L6X | 13 |
| (2) Tokuyama Soda | LS-60WH | 7 |
| (3) Tokuyama Soda | LS-60WF | 8 |
| (4) Nippon Shokubai | Eposter GP-H60 4E13 | 7 |
| (5) Nippon Shokubai | Eposter GPH | 13 |

In the LCDs (1) and (5), the number of the spacers existing inside the pixels is small, and the polymer walls hardly intrude into the pixel regions. The polymer walls are formed substantially corresponding to the photomask pattern in most regions.

In the LCDs (2), (3) and (4), the number of the spacers existing inside the pixels is large, and the polymer resin adhering to the spacers 9 and left elongated trails in the positions away from the photomask pattern being affected by the spacers 9 remaining around the polymer walls.

The ratio applied to the substrate gap control material which tends to exist inside the polymer walls rather than in the liquid crystal regions as defined above is calculated with respect to the LCDs of this example. The results are obtained as follows.

(the number of the substrate gap control materials existing inside the polymer walls)/(the number of the substrate gap control materials existing in the liquid crystal portions)=1.14 for the LCD (1); 0.53 for the LCD (2); 0.61 for the LCD (3); 0.58 for the LCD (4); and 1.17 for the LCD (5).

Accordingly, in the case of using the spacers composed of a material which tends to exist inside the polymer walls rather than in the liquid crystal regions, the number of the spacers existing inside the pixels becomes small; the polymer walls hardly mingle with the pixel regions; and the polymer walls may be formed substantially corresponding to the photomask pattern in most regions. Consequently, an LCD with high contrast may be obtained.

EXAMPLE 3

In this third example, the substrate gap control materials are disposed at arbitrary positions. That is to say, the substrate gap control materials are disposed by a spacer printing technique in this case. An LCD in the STN mode is produced in this example, too.

The LCD in the STN mode according to the third example of the invention is constructed in the same manner as in the LCD shown in FIG. 1.

In the LCD shown in FIG. 1, a pair of substrates 1a and 1b made of glass or the like are disposed so as to be opposed to each other, and liquid crystal regions 6 surrounded by polymer walls 7 are sandwiched between the pair of substrates 1a and 1b so as to be employed as a display medium. On the surfaces of the substrates 1a and 1b facing the display medium, strip-shaped transparent electrodes 2a and 2b are formed. Over the electrodes 2a and 2b, electrically insulating films 3a and 3b are formed. Pixel portions 12 including the liquid crystal regions 6 are defined by the opposed portions of the transparent electrodes 2a and 2b.

The peripheral edges of the opposed substrates 1a and 1b are attached to each other by a sealing agent 5. In addition, spacers 9 are present in the gap between the pair of substrates 1a and 1b as the substrate gap control materials. As shown in the plan view of FIG. 7, the number of the spacers 9 existing inside the polymer walls 7 is larger than that of the spacers 9 existing in the pixel portions 12 including the liquid crystal regions 6.

This LCD in the STN mode is produced in the following manner.

First, indium tin oxide (ITO) films are deposited on the substrates 1a and 1b by a sputtering technique so that the thickness thereof is 200 nm, thereby forming the electrically insulating films 3a and 3b made of $SiO_2$ by a sputtering technique so that the films 3a and 3b cover the strip-shaped transparent electrodes 2a and 2b.

And then the alignment films 4a and 4b are formed thereon by spin-coating polyimide (Sunever 150; manufactured by Nissan Chemical Industries Ltd.) thereto, and subjected to a rubbing treatment with a nylon cloth or the like in a direction, respectively. The number of the transparent electrodes 2a and 2b is set to be four in a width direction per one millimeter. The gap between the adjacent electrodes is set to be 25 µm.

Next, onto one of the pair of substrates 1a and 1b subjected to the rubbing treatment, the spherical spacers (Micropearl; manufactured by Sekisui Fine Chemicals) dispersed in a commonly-used UV resin (the spacers were contained at 30 wt %) are printed through a metal screen plate in one of the patterns shown in FIGS. 7A to 7D. In this case, either the rubbing treatment step or the spacer printing step may be conducted first. In the case of conducting the spacer printing first, the UV curable resin containing the spacers are cured by applying light or heart thereto, and then the rubbing treatment is conducted. In this example, a spacer positioner (manufactured by IC-TECH) is used. FIG. 8 shows the printing condition in the case of using the pattern shown in FIG. 7B. As shown in FIG. 8, the printing is conducted by disposing a metal screen plate 102 having the holes 104 (diameter: 10 µm) for introducing the spacers on the substrate 106; placing an UV curable resin or a thermosetting resin including the spacers 108 on the screen plate 102; and moving the resin corresponding to the printing direction 112 by a squeegee 110. Reference numeral 116 indicates a portion corresponding to a pixel on the substrate 106.

Then, UV ray irradiation is conducted, thereby fixing the spacers 114 on the substrate in one of the patterns shown in FIGS. 7A to 7D.

In this example, the printing patterns shown in FIGS. 7A to 7D are used. Alternatively, any pattern may be used so long as the number of the spacers in the polymer walls portions is larger than that in the pixel regions. The spacers are printed on one of the pair of substrates. However, the spacers may be printed on both substrates. In addition, the kind and the material of the spacers to be used are not limited to those described above.

Next, the pair of substrates 1a and 1b subjected to the rubbing treatment are opposed to each other so that the two rubbing alignment directions may be crossed at the angle of 60 degrees. Subsequently, the peripheral edges of the substrates 1a and 1b are attached by the sealing agent 5 (Structbond XN-21S; baking temperature: 140° C. to 150° C./2 h), whereby a liquid crystal cell is produced.

Then, a mixture material used as a display medium is injected into the gap between the substrates 1a and 1b of this liquid crystal cell at an ambient temperature of 30° C. The mixture material for the display medium is obtained by mixing: 4 g of a liquid crystal material ZLI-4427 (including S-811 manufactured by Merck & Co., Inc.); 0.1 g of R-684 (manufactured by Nippon Kayaku Co., LTD), 0.07 g of p-phenylstyrene, 0.8 g of isobornylmethacrylate, and 0.1 g of perfluoromethacrylate as photocurable resin materials; and 0.03 g of Irgacure 651 (manufactured by Ciba Geigy) as a photoinitiator. In this case, other kinds of curable resins may be used for forming the polymer walls 7. The injection holes are sealed with a commonly used UV curable resin. At this step, the display portion of the substrates (or the injected mixture) should not be irradiated with the rays.

Next, a photomask is placed on one of the substrates of the liquid crystal cell produced in the above-described manner so that the pixel portions may block the UV rays. Then, the mixture material is irradiated with UV rays from the photomask side. For example, a high-pressure mercury lamp for irradiating collimated UV rays is employed as a light source. Light irradiation is conducted at a position where the intensity of the rays emitted from high-pressure mercury lamp is 10 mW/cm². The temperature of the substrates during this UV ray irradiation may be a temperature equal to or higher than $T_{NI}$ where the liquid crystal transitions from a nematic phase to an isotropic liquid phase. As a means for selectively irradiating the light, an organic film, an inorganic film or a metal film may be used in place of the photomask so as to selectively distribute the irradiated light.

In the case where the UV ray irradiation is conducted while heating the substrates at a high temperature ($T_{NI}$ or higher) so as to stabilize the orientation of the liquid crystal, the substrates are slowly cooled down to room temperature inside a slow cooling oven after the irradiation step. The cooling rate is preferably in the range of 3° C./h to 20° C./h, and more preferably in the range of 5° C./h to 10° C./h. After the polymer walls 7 are formed, UV ray irradiation may be conducted again for a short period of time at a weak intensity so that the non-reacted materials are cured or that the polymers are sufficiently crosslinked. In this way, the liquid crystal portion and the polymer wall portions are formed. The liquid crystal portions show an STN orientation having a twist angle of 240 degrees.

The polarizers 17 shown in FIG. 6 are attached to the liquid crystal panel of FIG. 1 which has been produced in the above-described manner. As shown in FIG. 9, the angle formed between the respective two polarization directions P and A of the polarizers 17 is set to be 60 degrees, and the angles formed between the two polarization directions P and A and the corresponding two rubbing direction R1 and R2 are set to be 45 degrees respectively, thereby producing an STN-mode LCD of a yellow mode transmission type.

The portions corresponding to four pixels of the liquid crystal panel are observed with a microscope and an SEM.

As a result, it is revealed that the spacers 9 exist substantially corresponding to the pattern of the screen plate and that the polymer walls 7 are formed substantially corresponding to the photomask pattern. The contrast ratio, one of the electrooptic characteristics of this LCD thus produced, measures the same value of 15 as that of the liquid crystal panel of Example 2 with respect to all the LCDs produced by using the respective four patterns shown in FIGS. 7A to 7D. The contrast ratio is measured by transmitting the light through the LCD panel, and is indicated by a ratio between the transmittance when no voltage is applied and that when a saturation voltage is applied.

In this Example 3, the present invention is applied to a transmission type LCD in the STN mode without using phase plates. However, the present invention is not limited thereto, but instead may be applied to a reflective LCD in the STN mode by providing reflectors therefor. In the case where the phase plates are provided for the LCD, monochrome display colors and the like may also be used. If the phase plates patterned so as to correspond to the respective pixels are provided for the LCD in the STN mode, a liquid crystal display mode of high quality is realized. A material for the substrates is not particularly limited in this example, but a light-transmitting transparent body such as a glass plate and a plastic film may be used. In addition, one of the pair of substrates may contain metal.

Moreover, if the substrate gap control materials obtained by mixing photopolymerizable compound materials and fine particles having different refractive indices are used, then the fine particles may also be absorbed into the polymer walls and the polymer walls may scatter the light.

EXAMPLE 4

In this fourth example, the polymer walls contain fine particles having a different refractive index from that of the material of the walls.

In this example, an LCD in the STN mode is produced in the same way as in Example 2, except for the mixture material to be injected into the gap between the liquid crystal cell including a pair of substrates.

The mixture material of this example is obtained by mixing: 4 g of a liquid crystal material ZLI-4427 (including S-811 manufactured by Merck & Co., Inc.); 0.1 g of R-684 (manufactured by Nippon Kayaku Co., LTD), 0.07 g of p-phenylstyrene, 0.8 g of isobornylmethacrylate, and 0.1 g of perfluoromethacrylate as photocurable resin materials; 0.03 g of Irgacure 651 (manufactured by Ciba Geigy) as a photoinitiator; and 0.6 g of niobium oxide sol (particle diameter: 0.5 µm, refractive index n: 1.432). The refractive index n of the polymer resin is 1.174.

In the LCD of this example produced in the above-described manner, the fine particles exist everywhere inside the panel. However, since the fine particle has a small diameter, the presence of the particles inside the pixel portions does not affect the display quality of the panel and the contrast. Accordingly, the fine particles exist inside the polymer walls, too. The brightness L* of the LCD thus obtained is measured using a spectrophotometer (CM-1000; manufactured by Minolta Camera K.K.). As a result, L* is 41.3. On the other hand, the brightness L* of the panel produced in Example 2 is also measured using a spectrophotometer (CM-1000; manufactured by Minolta Camera K.K.). As a result, L* is 38.1. Therefore, in this example, L* is increased by adding the fine particles to the mixture by about 8%. Consequently, the brightness of the panel may be improved by mixing the polymer resin and the fine particles having respective different refractive indices.

The material of the fine particles is not limited to that described above in this example, but any material may be used so long as the refractive index of the material is different from that of the polymer resin and the particle diameter of the material is smaller than the diameter of the spacer. One kind of fine particle is used in this example. However, the present invention is not limited thereto, but the same effects may be attained even in the case of using two or more kinds of fine particles.

EXAMPLE 5

Hereinafter, a fifth example according to the present invention will be described below.

An LCD according to the fifth example is constructed in the same way as the LCD shown in FIG. 1. In the LCD shown in FIG. 1, a pair of substrates 1a and 1b made of glass or the like are disposed so as to be opposed to each other, and liquid crystal regions 6 and polymer wall regions 7 are sandwiched between the pair of substrates 1a and 1b so as to be employed as a display medium. On the surfaces of the substrates 1a and 1b facing the display medium, strip-shaped transparent electrodes 2a and 2b are respectively formed. Over the electrodes 2a and 2b, electrically insulating films 3a and 3b are optionally formed if necessary, and alignment films 4a and 4b are respectively formed thereon. Pixel portions 12 including the liquid crystal regions 6 are defined by the opposed portions of the transparent electrodes 2a and 2b. The peripheral edges of the opposed substrates 1a and 1b are attached to each other via a sealing agent 5. In addition, spacers 9 are present in the gap between the substrates 1a and 1b as the substrate gap control materials.

This LCD may be produced, for example, in the following manner.

First, indium tin oxide (ITO) films are deposited on the substrates 1a and 1b by a sputtering technique so that the thickness thereof is 200 nm, thereby forming the strip-shaped transparent electrodes 2a and 2b thereon. Next, the electrically insulating films 3a and 3b are respectively formed also by a sputtering technique so that the films 3a and 3b cover the transparent electrodes 2a and 2b. Subsequently, the alignment films 4a and 4b are formed thereon, and then subjected to a rubbing treatment with a nylon cloth or the like. In this case, at least one of the substrates 1a and 1b is required to be made of a light-transmitting transparent material such as glass or plastic. Therefore, if one of the substrates is transparent, then a metal film or the like may be formed on the other substrate. The alignment films 4a and 4b are optionally formed, that is to say, the alignment films 4a and 4b are not formed if unnecessary.

Under such a state, the spacers 9 are scattered onto (the alignment films 4a and 4b on) the surfaces of the pair of substrates 1a and 1b. And then the substrates 1a and 1b are disposed so that the transparent electrodes 2a and 2b are perpendicularly opposed to each other. Finally, the peripheral edges of the substrates 1a and 1b are attached with the sealing agent 5, whereby a liquid crystal cell is produced.

The mixture containing at least a liquid crystal material and a polymerizable compound is injected into the gap (between the substrates 1a and 1b) of the liquid crystal cell produced in this way.

In this case, it is possible to use any liquid crystal material that is employable in a conventional LCD in a TN mode, an STN mode, an ECB mode, an FLC mode, and a light-scattering mode. For example, ZLI-4792 (manufactured by Merck & Co., Inc.) containing a chiral agent (S-811) by 0.3% may be used.

Any polymerizable compound may be employed so long as the compressive value of the compound is 10 g/mm$\phi$ or more when the compound is cured under the mixture state. As a photopolymerizable compound, for example, a mixture of p-phenylstyrene, isobornylmethacrylate, and perfluoromethacrylate and the like may be employed. Either a single compound of these polymerizable compounds or an arbitrary combination thereof may be employed. The mixture material may contain an initiator as well. For example, a photoinitiator such as Irgacure 651 (manufactured by Ciba Geigy) may be used. After the mixture material is injected, the injection hole is sealed with an ultraviolet-curable resin. When the ultraviolet-curable resin is irradiated with UV rays, care must be taken so that the display portion (or the injected mixture) of the substrate is not irradiated with the UV rays.

Next, the mixture is either heated or irradiated with light such as UV rays by a source outside the liquid crystal cell (in this example, the mixture is irradiated with the light). In this case, the substrate to which some kind of energy such as heat and light is subjected to a treatment for reducing the energy intensity such an amount of the light to be transmitted through the arbitrary portions intended for the liquid crystal regions 6.

During the UV ray irradiation, the amount of the light to be transmitted is selectively distributed by blocking the rays with a photomask or by absorbing the UV rays by a metal film, an organic film, or an inorganic film, such as ITO. A high-pressure mercury lamp for emitting collimated UV rays may be employed as a light source. The light irradiation is conducted at a position where the intensity of the high-pressure mercury lamp is 10 mW/cm$^2$. The temperature of the substrates during the UV ray irradiation may be either ambient temperature, or a temperature where the liquid crystal is in an isotropic liquid state. If the UV ray irradiation is conducted at a temperature equal to or higher than $T_{NI}$ (a nematicisotropic transition temperature), the orientation of the liquid crystal molecules may be stabilized.

According to this example, the intensity of the energy to be applied is selectively distributed, so that the polymerization rate in the portions to which relatively high energy is applied is higher than that in the portions to which relatively low energy is applied. As a result, the polymers are aggregated in the portions to which high energy is applied and the liquid crystal is aggregated in the portions to which low energy is applied, and therefore the phase separation of the liquid crystal and the polymers occurs. In consequence, a display medium in which the liquid crystal regions 6 and the polymer walls are selectively formed at arbitrary positions is formed in the gap between the pair of substrates 1a and 1b.

In the case where the UV ray irradiation is conducted while heating the substrates to a high temperature in order to stabilize the orientation of the liquid crystal, it is preferable to cool the substrates down slowly to room temperature inside a slow cooling oven. The cooling rate is preferably in the range of 3° C./h to 20° C./h, and more preferably in the range of 5° C./h to 10° C./h.

Figure 10A:
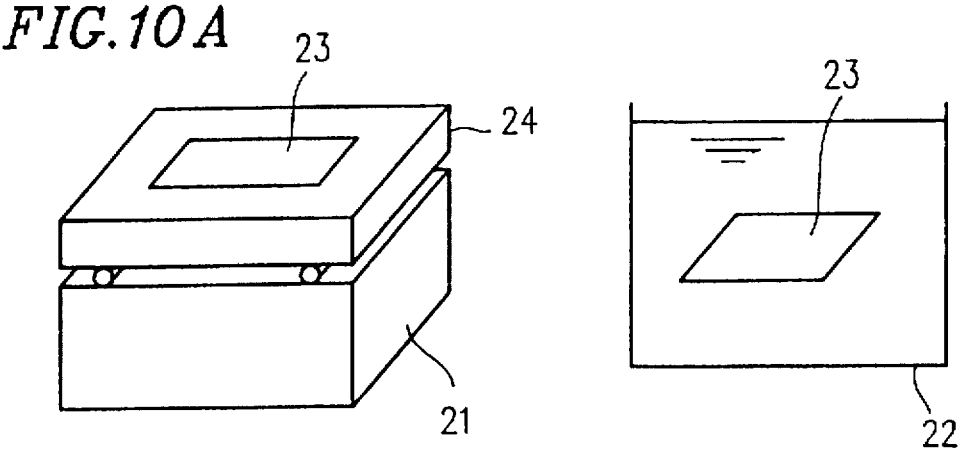
FIG. 10A is a schematic view showing a vibration generator 21 and ultrasonic vibration generator 22 for moving fine particle such as spacers.

During this slow cooling step, as shown FIG. 10A, vibration in the approximate range of 10 Hz to 10 KHZ is applied to the panel including the substrates and the mixture, etc., by using a vibration generator 21 or an ultrasonic vibration generator 22. In this case, a vibrating plate 24 retaining a panel 23 is placed on the vibration generator 21, thereby vibrating the panel 23. In the case of using an ultrasonic vibration generator 22, the panel 23 is immersed in the liquid such as water which has been filled into the ultrasonic vibration generator 22, thereby applying the ultrasonic wave to the panel 23. As a result, the movement of the liquid crystal molecules caused by the change of the substrate gap, and the like becomes large, and so the mobility of the spacers 9 becomes high.

Figure 10B:
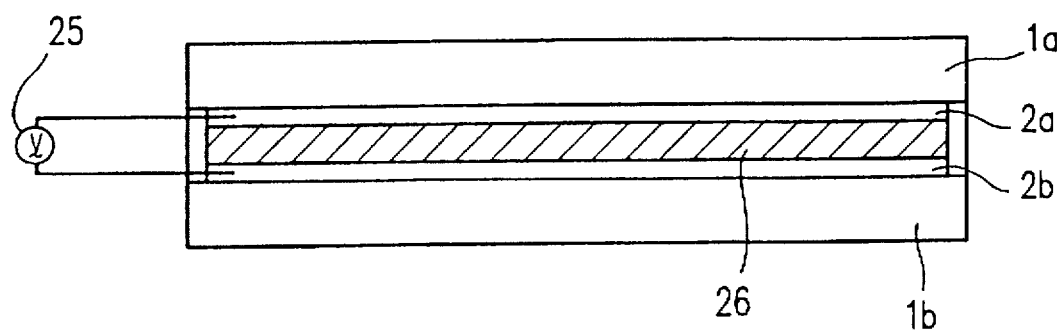
FIG. 10B is a schematic view showing a method of applying a voltage for moving fine particles such as spacers.

Depending on the case, as shown in FIG. 10B a voltage substantially equal to a driving voltage, e.g. in the approximate range of 2 to 2.5 volts in the STN mode, may be applied from a driving voltage source 25 to the gap between the transparent electrodes 2a and 2b on the pair of substrates 1a and 1b, thereby causing the liquid crystal molecules to move at a great extent. As a result, the mobility of the spacers 9 becomes high, so that a larger amount of fine particles such as the spacers 9 are introduced into the polymer walls 7. In consequence, the strength of the polymer walls 7 may be enhanced and the shock resistance of the substrate may be further improved. Any fine particles such as a substrate gap control material (e.g. a silica spacer), iron powders and resin powders may be employed so long as the particles are rigid and fine to a certain degree. An arbitrary amount of spacers 9 may be dispersed inside the polymer walls 7, but the amount is preferably in the range of 5 to 200 particles per square millimeter.

After the formation of the polymer walls 7, if necessary, UV ray irradiation may conducted again for a short period of time at a weak intensity so that the non-reacted materials are cured and enclosed inside the polymer walls 7 and that the polymers are sufficiently crosslinked.

In this example too, the spacers 9 are introduced into the polymer walls 7 just in the same way as in Example 1, as shown in FIGS. 3A to 3E.

During the slow cooling step shown in FIGS. 3C and 3D, if the substrates and the mixture are vibrated, or if a voltage is applied to the gap between the pair of substrates by a method shown in FIGS. 10A and 10B, then the mobility of the spacers 9 may be increased and the spacers 9 may be introduced more easily into the polymer walls 7. In other words, a greater amount of spacers 9 may be introduced into the polymer walls 7, or they may be introduced thereto at a higher rate. As a result, the number of the spacers remaining in the pixel portions may be decreased and this may be even smaller.

In the LCD thus-obtained, as shown in FIG. 2, a larger number of spacers 9 exist inside the polymer walls 7, so that the hardness of the polymer walls 7 is increased. Moreover, since the liquid crystal regions and the polymer walls 7 are selectively formed at arbitrary positions, the liquid crystal regions 6 are formed in the pixels portions 12 and the polymer walls are formed in the portions excluding the pixel portions 12. Therefore, all or an even larger number of spacers 9 are removed from the pixel portions 12, and an LCD of higher quality and higher contrast is obtained.

This LCD obtained in the above-mentioned manner may be employed as an LCD in a TN mode, an STN mode, an FLC mode, or an ECB mode, by changing the liquid crystal injected into the cell and/or changing the alignment film. In addition, this LCD may be employed as an LCD utilizing a light-scattering mode; and as a transmission-type or a reflective LCD by providing the polarizers and the reflectors.

In the above-described Examples, an LCD conducting a display by simple-matrix driving has been described. However, this method may also be applied to other LCDs conducting several kinds of displays by active-matrix driving and the like with thin-film transistors (TFTs) and metal-insulator-metals (MIMs), etc. Accordingly, any driving method may be employed in these examples. The LCD according to these examples may conduct a color display by providing a color filter and a black mask for the LCD.

Hereinafter, a specific example with respect to the fifth example will be described in detail below.

SPECIFIC EXAMPLES 5-1

First, transparent electrodes 2a and 2b made of ITO having a thickness of 200 nm are formed over the pair of substrates 1a and 1b by a sputtering technique. Next, electrically insulating films 3a and 3b are formed so as to cover the transparent electrodes 2a and 2b also by a sputtering technique. The alignment films 4a and 4b are formed thereon, and then subjected to a rubbing treatment with a nylon cloth. Under this state, the pair of substrates 1a and 1b are perpendicularly opposed to each other, and then silica spacers 9 or the like are dispersed therebetween at about 50 particles/mm$^2$. Finally, the peripheral edges of these substrates are attached to each other with a sealing agent 5, thereby fabricating the liquid crystal cell.

Into the gap between the pair of substrates 1a and 1b of this liquid crystal cell, the mixture including 4 g of ZLI-4792 (manufactured by Merck & Co., Inc.) containing a chiral agent (S-811) by 0.3% as a liquid crystal material; the mixture of p-phenylstyrene, isobornylmethacrylate, and perfluoromethacrylate (1:6.5:2.5) as a photopolymerizable compound; and Irgacure 651 (manufactured by Ciba Geigy) as a photoinitiator is injected.

Next, one surface of the substrates is covered with a photomask so that the portions corresponding to the liquid crystal regions 6 are light-shielding portions, and then the UV rays are irradiated from the photomask side using a high-pressure mercury lamp which emits collimated beams. Light irradiation is conducted at a position where the intensity thereof is 10 mW/cm$^2$. After this irradiation is completed, the cell is slowly cooled inside the slow cooling oven. Further, the UV ray irradiation is conducted again for a short period of time at a weak intensity in order that the non-reacted material is cured and that the polymers are sufficiently crosslinked.

The hardness of the polymer walls formed inside the LCD is measured by using a pencil-shaped simplified tester with a jig made of aluminum (Al) having a diameter of 1 mm$\phi$ which is attached to the top end 81 of the head portion thereof as shown in FIG. 11. As a result, the hardness is about 10 g/mm$\phi$. The dispersion amount of the spacers 9 introduced into the polymer walls 7 is approximately 50 particles per square millimeter. As shown in FIG. 11, a polymer plate 53 processed so as to be 5 to 10 μm thick is placed on a stage 52 made of Al, and then the actual pressure is measured by using a pressure detector provided with a pressure meter 54.

In the case where an LCD was produced by using a 7059 glass having a thickness of 0.5 mm for the substrates, the pressure strength measured by the tester disposed above the glass substrate as shown in FIG. 11 is 1000 g/mm$\phi$. On the other hand, in the case where an acryl-based plastic having a thickness of 0.4 mm is used for the substrates, the pressure strength is approximately 750 g/mm$\phi$.

COMPARATIVE EXAMPLE 5-1

In the same way as in Specific Example 5-1, the pair of substrates provided with the electrodes and the alignment films (plastic films having a thickness of 0.4 mm are used as the substrates) are attached to each other with a sealing agent interposing the spacers herebetween. The liquid crystal and the photocurable resin are sandwiched in the gap between the pair of substrates. In this Comparative Example 5-1, a ZLI-4792 liquid crystal (manufactured by Merck & Co. Inc.: containing a chiral agent S-811) and a photocurable resin (stearylacrylate) are used, and the liquid crystal and he photocurable resin are mixed so that the mole fraction ratio is 8.2 instead of 1.8. And then the mixture is injected into the gap by a conventional vacuum injection method. Subsequently, UV rays are irradiated from above the photomask at an intensity of 10 mW/cm$^2$, thereby phase-separating the liquid crystal and the photocurable resin so as to correspond to the photomask pattern. After the phase separation, the UV rays are irradiated again so as to improve the degree of crosslinking of the polymers. The pressure test conducted in Example 5 is conducted with respect to the liquid crystal cell thus-produced. As a result, the polymer walls are broken at the pressure strength of 120 g/mm$\phi$. On the other hand, in the case where only the photocurable resin is irradiated with the UV rays so as to be polymerized and the shock resistance thereof is measured using a pen with an aluminum top end having a diameter of 1 mm$\phi$ in the same way as shown in FIG. 11 the compressive value of the cured resin was approximately 9 g/mm$\phi$.

SPECIFIC EXAMPLE 5-2

In this Specific Example of the present invention, the hardness of the polymer walls 7 is improved by moving the fine particles such as the spacers 9 for controlling the gap, so that a large of number of such particles are introduced into the polymer walls 7 during the phase separation of the liquid crystal and the polymers. The substrates are produced in the same way as in Example 5, and the same material is used for the mixture materials such as the liquid crystal material and the polymerizable compound as those used in Example 5. The same production steps as those of Example 5 are performed until the light irradiation step for phase-separating the liquid crystal and the polymers. Thereafter, during the slow cooling step, the substrates is given a vibration of 1 KHz by the vibration generator 21 as shown in FIG. 10A. The vibration caused the substrate gap to change, so that the mobility of the spacers 9 becomes large. As a result, a greater number of spacers 9 are introduced into the polymer walls 7, or they are introduced thereto at a higher rate as compared with those of Specific Example 5-1.

Subsequently, the UV ray irradiation is conducted again for a short period of time at a weak intensity so that the non-reacted materials are cured and that the polymers are sufficiently crosslinked.

The hardness of the polymer walls formed inside the LCD is measured with a pencil-shaped simplified tester with a jig made of Al having a diameter of 1 mm$\phi$ at the top end 51 of the head portion thereof as shown in FIG. 11. The measurement result is approximately 21 g/mm$\phi$. On the other hand, the amount of the spacers 9 introduced into the polymer walls 7 is larger than that of Specific Example 5-1.

In the case where an LCD is produced by using 7059 glass having a thickness of 0.5 mm for the substrates, the pressure strength measured by the tester disposed above the glass substrate as shown in FIG. 11 is 1250 g/mm$\phi$. On the other hand, if an acryl-based plastic having a thickness of 0.4 mm is used for the substrates, the pressure strength is approximately 920 g/mm$\phi$.

Judging from the results of the above-mentioned Specific Examples 5-1 and 5-2, it is found that the hardness of the polymer walls 7 increases in the case where a larger amount of fine particles such as spacers 9 are contained in the polymer walls, and that the shock resistance of the LCD improves if the hardness of the polymer walls 7 is higher.

Figure 12A:
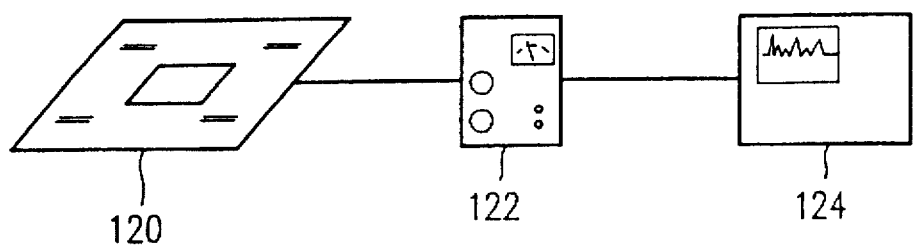
FIGS. 12A and 12B are views showing a device for measuring pressure values applied to an LCD in the case of inputting with a pen.
Figure 12B:
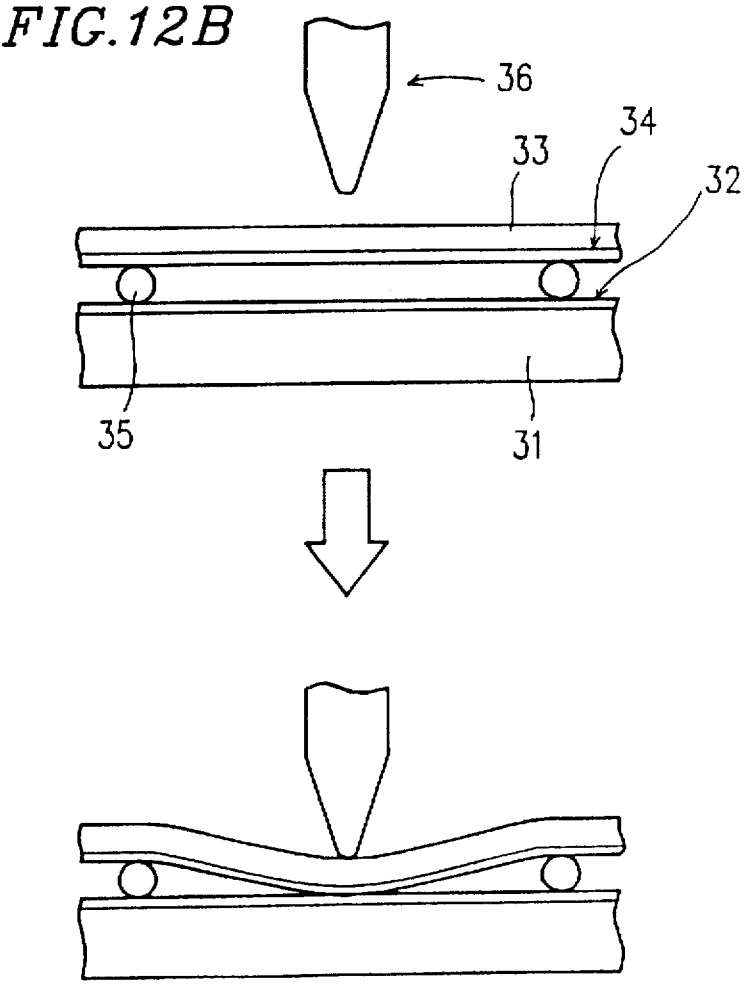

The following Table 2 shows the measurement results of the pressure applied to the LCD in the case of inputting the data with a pen. This experiment is conducted in the following manner: the device shown in FIGS. 12A and 12B is employed; ten men and ten women are instructed to write the four characters "あ", "ぁ", "8" and "4" on the surface of the substrate; and the respective pressure values are measured. As shown in FIG. 12A, a strain generated at a test tablet 120 is detected by a dynamic strain detector 122 and monitored by a oscilloscope 124. In the tablet 120, as shown in FIG. 12B, the spacers 35 are provided between the transparent electrode 32 on the glass substrate 31 and the transparent electrode 34 on the polyethyleneterephthalate (PET) resin 33. The pressure is applied onto the PET resin 33 with a pen.

TABLE 2

| measured values (g/mmφ) | maximal | minimal | average |
|---|---|---|---|
| men (10 persons) | 740 | 210 | 450 |
| women (10 persons) | 420 | 180 | 320 |

(average value of all the persons is 385 g/mmφ)

As shown in Table 2, the maximal value of the pressure applied to the LCD by one of the ten men is 740 g/mmφ, while the maximal value by one of the ten women is 420 g/mmφ. On the other hand, the average value of the pressure applied by the twenty persons is 385 g/mmφ. Considering this result, it should be sufficient for an LCD provided with a data inputting pen to have the strength of about 750 g/mmφ. Accordingly, the LCDS of Specific Examples 5-1 and 5-2 are suitable for inputting the data with a pen.

On the other hand, the following methods may also be employed for improving the compressive value of an LCD.

1. A method in which a protection substrate made of plastic, glass, or the like is separately provided for the input surface of an LCD.
2. A method in which a substrate having a sufficient thickness is employed as a substrate on the input side in order that a deflection and the like may not occur by the input operation with a pen.
3. A method in which a great deal of spacers are dispersed.
4. A method in which wall-shaped organic films, such as photoresist films or the like, are formed so as to serve as spacers.

Each method has its own characteristic problems. According to the methods 1 and 2, for example, a parallax is generated between the display position and the top end of the pen. If the methods 1 to 3 are employed, then the device becomes so heavy or so large-scale that the necessary cost becomes disadvantageously high. According to the method 4, the volume of the regions for injecting the liquid crystal is required to be limited, so that it takes much more time to inject the liquid crystal and the production process of the LCD becomes adversely complicated.

As compared with these methods, the LCD according to the present invention may be produced more easily only by slightly modifying the production process of a polymer dispersed LCD, and the device does not cause a parallax and does not become too heavy or too large. In addition, this LCD may be produced at a reasonable cost, thereby exerting much practical effect.

As described above, the polymer walls, formed at arbitrary positions in the gap between the opposed substrates, may have an strength against externally applied pressure which is expressed by the compressive value equal to or more than 10 g/mmφ. This value is sufficient for resisting the pressure applied to an LCD when an ordinary input operation with a pen is performed. Accordingly, it is no longer necessary to place a protection substrate, such as a glass substrate and a plastic film on the substrate, for improving the strength thereof against externally applied pressure. As a result, a parallax between the top end of the pen and the display position may be eliminated and the weight of the device may be further reduced. In addition, according to the production method of the present invention, the substrate gap control materials may be introduced into the polymer walls, thereby improving the hardness of the polymer walls and the strength of the entire substrate. Furthermore, according to this production method, all or a large number of substrate gap control materials may be removed from the liquid crystal regions, so that the display quality of the pixels and the contrast thereof may be greatly improved.

As described above, according to the present invention, a larger number of substrate gap control materials may exist inside the polymer walls, so that all or a large number of substrate gap control materials may be removed from the pixels, thereby improving the quality and the contrast of the display pixels. In addition, according to the invention, either a method in which substrate gap control materials which tend to exist inside the polymer walls rather than in the liquid crystal regions are used, or a method for printing and distributing the substrate gap control materials may be employed.

In the case of utilizing the method in which substrate gap control materials which tend to exist inside the polymer walls rather than in the liquid crystal regions are used, the substrate gap control materials, no matter whether the materials are polymer resins or spherical spacers, are expelled out of the liquid crystal regions being affected by the surface tension of the liquid crystal during the phase separation of the liquid crystal and the polymers, so that the substrate gap control materials may be introduced into the polymer walls.

Furthermore, if an alignment film composed of a material which tends to make the substrate gap control materials inside the polymer walls more easily is formed on at least one of the substrates, then no substrate gap control materials remain in the alignment film. As a result, all or an even larger number of substrate gap control materials may be removed from the pixels, thereby further improving the display quality and the contrast of the display pixels.

On the other hand, in the case of utilizing the method for printing and distributing the substrate gap control materials, the substrate gap control materials may be distributed at arbitrary positions, so that a larger number of substrate gap control materials may exist inside the polymer walls more easily. In addition, the substrate gap control materials may be utilized more efficiently than the dispersion method.

Moreover, while the mixture including the liquid crystal and the photopolymerizable resin is irradiated with UV rays, if the irradiation intensity is selectively differentiated between the pixel potions and the portions excluding the pixel portions by covering the portions corresponding to the pixel portions with a photomask, then the liquid crystal regions may be formed easily inside the pixel portions under a simplified structure and the polymer walls may be formed easily in the portions excluding the pixel portions. As a result, all or a large number of substrate gap control materials may be removed from the pixels. On the other hand, if transparent electrodes or the like composed of an organic film, an inorganic film or a metal film are formed on at least one of the substrates facing the display medium in place of the photomask, then the irradiated light may be selectively distributed more easily.

In addition, according to the present invention, the compressive value of the polymer walls formed at arbitrary positions in the gap between the opposed substrates is 10 g/mmφ or more, so that the strength of the LCD against the shock externally applied may be increased and this LCD may satisfactorily resist the pressure applied during an ordinary input operation with a pen. On the other hand, since it is not necessary to provide a protection substrate or the like for this LCD in order to improve the strength of the substrate, a parallax does not occur between the display position and so the top end of the pen, and the device does not become too heavy or too large.

Furthermore, according to the present invention, a large number of substrate gap control materials, such as spacers, may be introduced into the polymer walls during the phase separation of the liquid crystal and the polymers, thereby further increasing the strength of the LCD. This introduction of a large number of substrate gap control materials into the polymer walls makes it possible to remove all or at least a larger number of spacers from the pixels, thereby further improving the display quality and the contrast of the display pixels.

Moreover, according to the present invention, the polymer walls may be attached to both of the substrates, so that the strength of the LCD may be further increased.

The LCD according to the present invention may be formed easily by slightly modifying the production process of a polymer dispersed LCD. Accordingly, the method of this invention does not complicate the production process and does not require higher costs.

The present invention may be applied, for example, to a flat panel display device, such as a personal computer, a liquid crystal TV, and a portable display device (including a film substrate). This invention may also be applied to several kinds of LCDs including a display medium operating in a twisted nematic (TN) mode, a super twisted nematic (STN) mode, an electrically controlled birefringence (ECB) mode, a ferroelectric liquid crystal (FLC) display mode, and a light-scattering mode in which the liquid crystal regions and the polymer walls are selectively formed at arbitrary positions by the phase separation in the gap between the opposed substrates; and the invention may also be applied to the production methods thereof. In particular, the present invention may be effectively applied to the LCD used for the terminal of a portable information device for inputting the data with a pen in which the display portion and the input portion are integrally formed, a TV requiring a wide viewing angle, and an office automation apparatus such as a display device; and the invention may also be applied to the production methods thereof.

Various other modifications will be apparent to and may be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a pair of substrates disposed so as to be opposed to each other; and a display medium interposed between the pair of substrates, the display medium having liquid crystal regions comprising one or a plurality of pixels, and the liquid crystal regions being surrounded by polymer walls, wherein a number of substrate gap control materials which are disposed in a gap between the pair of substrates is larger in the polymer walls than in the liquid crystal regions.

2. A liquid crystal display device according to claim 1, wherein the substrate gap control materials are composed of a material tending to exist in the polymer wells rather than in the liquid crystal regions.

3. A liquid crystal display device according to claim 1 comprising an alignment film on at least one of the pair of substrates, the alignment film being composed of a material tending to make the substrate gap control materials exist in the polymer walls.

4. A liquid crystal display device according to claim 1, wherein the substrate gap control materials are spherical spacers.

5. A liquid crystal display device according to claim 4, wherein the polymer walls include a mixture of at least one kind of fine particles having a different refractive index from a refractive index of the polymer walls.

6. A liquid crystal display device according to claim 1, wherein the substrate gap control materials are composed of a polymer resin.

7. A method for producing a liquid crystal display device comprising a pair of substrates disposed so as to be opposed to each other; and a display medium interposed between the pair of substrates, the display medium having liquid crystal regions comprising one or a plurality of pixels, and the liquid crystal regions being surrounded by polymer walls, the method comprising the steps of:

disposing the pair of substrates so as to be opposed to each other and interpose therebetween substrate gap control material composed of a material tending to exist in the polymer walls rather than in the liquid crystal regions, injecting a mixture including at least a liquid crystal material and a photopolymerizable compound into a gap between the pair of substrates; and selectively irradiating the mixture with ultraviolet rays, thereby forming a display medium comprising the liquid crystal regions surrounded by the polymer walls and making a larger number of the substrate gap control materials exist in the polymer walls than in the liquid crystal regions.

8. A method for producing a liquid crystal display device according to claim 7, wherein the step of selectively irradiating the mixture with ultraviolet rays comprises covering portions of the mixture corresponding to pixel positions with a photomask, thereby selectively differentiating intensities between the pixel portions and portions excluding the pixel portions.

9. A method for producing a liquid crystal display device according to claim 7, wherein the step of selectively irradiating the mixture with ultraviolet rays comprises forming an organic film, an inorganic film, or a metal film on at least one of the substrates facing the display medium to selectively distribute the irradiated ultraviolet rays.

10. A method for producing a liquid crystal display device according to claim 7, wherein the irradiation step comprises irradiating the mixture at a temperature equal to or higher than a nematic-isotropic phase transition temperature ($T_{NI}$) of the liquid crystal.

11. A method for producing a liquid crystal display device comprising a pair of substrates disposed so as to be opposed to each other; and a display medium interposed between the pair of substrates, the display medium having liquid crystal regions comprising one or a plurality of pixels, and the liquid crystal regions being surrounded by polymer walls, the method comprising the steps of:

disposing the pair of substrates so as to be opposed to each other by disposing substrate gap control materials at arbitrary positions on at least one of the pair of substrates;

injecting a mixture comprising at least a liquid crystal material and a photopolymerizable compound into a gap between the pair of substrates; and selectively irradiating the mixture with ultraviolet rays, thereby forming a display medium comprising the liquid crystal regions surrounded by the polymer walls and making a larger number of the substrate gap control materials exist in the polymer walls rather than in the liquid crystal regions.

12. A method for producing a liquid crystal display device according to claim 11, further comprising printing the substrate gap control material at arbitrary positions.

13. A method for producing a liquid crystal display device according to claim 11, wherein the step of selectively irradiating the mixture with ultraviolet rays comprises covering portions of the mixture corresponding to pixel positions with a photomask, thereby selectively differentiating intensities between the pixel portions and portions excluding the pixel portions, rays comprises covering portions of the mixture corresponding to pixel positions with a photomask, thereby selectively differentiating intensities between the pixel portions and portions excluding the pixel portions.

14. A method for producing a liquid crystal display device according to claim 11, wherein the step of selectively irradiating the mixture with ultraviolet rays comprises forming an organic film, an inorganic film, or a metal film on at least one of the substrates facing the display medium to selectively distribute the irradiated ultraviolet rays.

15. A method for producing a liquid crystal display device according to claim 11, wherein the irradiation step comprises irradiating the mixture at a temperature equal to or higher than a nematic-isotropic phase transition temperature ($T_{NI}$) of the liquid crystal.

16. A liquid crystal display device comprising: a pair of substrates disposed so as to be opposed to each other; and a display medium interposed between the pair of substrates, the display medium having liquid crystal regions surrounded by polymer walls at arbitrary positions, wherein the polymer walls are formed of a polymer material having a compressive value of 10 g/mm$\phi$ or more in its cured state.

17. A liquid crystal display device according to claim 16, wherein the display medium includes fine particles, and wherein the fine particles have a refractive index which is different than a refractive index of the polymer walls.

18. A liquid crystal display device according to claim 16, wherein the polymer wall includes at least one of a thermosetting resin and a photocurable resin, and the polymer walls are attached to both of the pair of substrates.

19. A method for producing a liquid crystal display device comprising a pair of substrates disposed so as to be opposed to each other; and a display medium interposed between the pair of substrates, the display medium having liquid crystal regions surrounded by polymer walls at arbitrary positions, the method comprising the steps of:

injecting a mixture including at least a liquid crystal material and a polymerizable compound having a compressive value of 10 g/mm$\phi$ or more in its cured state between the pair of substrates; and applying energy of heat or light to the mixture so as to phase separate the liquid crystal material and the polymerizable compound, thereby selectively forming the liquid crystal regions and the polymer wall at arbitrary positions.

20. A method for producing a liquid crystal display device according to claim 19 further comprising applying an arbitrary vibration to at least the mixture during the application of energy of heat or light to the mixture so as to phase separate the liquid crystal material and the polymerizable compound.

21. A method for producing a liquid crystal display device according to claim 19 further comprising applying an arbitrary voltage across the mixture interposed between the pair of substrates during the application of energy of heat or light to the mixture so as to phase separate the liquid crystal material and the polymerizable compound.

* * * * *